(12) United States Patent
Duffield et al.

(10) Patent No.: US 9,785,317 B2
(45) Date of Patent: Oct. 10, 2017

(54) PRESENTATION AND ANALYSIS OF USER INTERACTION DATA

(71) Applicant: Palantir Technologies, Inc., Palo Alto, CA (US)

(72) Inventors: Ben Duffield, London (GB); Geoff Stowe, San Francisco, CA (US); Ankit Shankar, Millbrae, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 551 days.

(21) Appl. No.: 14/228,109

(22) Filed: Mar. 27, 2014

(65) Prior Publication Data

US 2015/0089424 A1    Mar. 26, 2015

Related U.S. Application Data

(63) Continuation of application No. 14/035,889, filed on Sep. 24, 2013, now Pat. No. 8,689,108.

(51) Int. Cl.
  G06F 3/048    (2013.01)
  G06F 3/0484   (2013.01)
  G06Q 10/00    (2012.01)

(52) U.S. Cl.
  CPC .......... G06F 3/0484 (2013.01); G06Q 10/00 (2013.01)

(58) Field of Classification Search
  CPC ......... G06F 17/30991; G06F 17/30386; G06F 3/04847; G06F 17/30861; G06F 17/30572;

(Continued)

(56) References Cited

U.S. PATENT DOCUMENTS 5,109,399 A    4/1992    Thompson
5,329,108 A    7/1994    Lamoure (Continued)

FOREIGN PATENT DOCUMENTS

CN    102054015       5/2014
DE    102014103482    9/2014

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Tadeese Hailu
(74) *Attorney, Agent, or Firm* — Knobbe, Martens, Olson & Bear, LLP

(57) ABSTRACT

An interactive, graph-based user interaction data analysis system is disclosed. The system is configured to provide analysis and graphical visualizations of user interaction data to a system operator. In various embodiments, interactive visualizations and analyzes provided by the system may be based on user interaction data aggregated across particular groups of users, across particular time frames, and/or from particular computer-based platforms and/or applications. According to various embodiments, the system may enable insights into, for example, user interaction patterns and/or ways to optimize for desired user interactions, among others. In an embodiment, the system allows an operator to analyze and investigate user interactions with content provided via one or more computer-based platforms, software applications, and/or software application editions.

18 Claims, 24 Drawing Sheets

(58) Field of Classification Search
CPC ..... G06F 3/0484; G06T 11/20; G06N 99/005; H04L 63/1416; H04L 63/1425
See application file for complete search history.

(56) References Cited

U.S. PATENT DOCUMENTS

| | | | |
|---|---|---|---|
| 5,632,009 A | 5/1997 | Rao et al. |
| 5,670,987 A | 9/1997 | Doi et al. |
| 5,781,704 A | 7/1998 | Rossmo |
| 5,845,300 A | 12/1998 | Comer |
| 6,057,757 A | 5/2000 | Arrowsmith et al. |
| 6,091,956 A | 7/2000 | Hollenberg |
| 6,161,098 A | 12/2000 | Wallman |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,456,997 B1 | 9/2002 | Shukla |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,714,936 B1 | 3/2004 | Nevin, III |
| 6,775,675 B1 | 8/2004 | Nwabueze et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,280,880 B1 | 10/2012 | Aymeloglu et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,709 B2 | 10/2013 | Goodson et al. |
| 8,577,911 B1 | 11/2013 | Stepinski et al. |
| 8,589,273 B2 | 11/2013 | Creeden et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,683,389 B1 * | 3/2014 | Bar-Yam .............. G06F 3/0481 715/712 |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |

(56) References Cited

U.S. PATENT DOCUMENTS

| | | | |
|---|---|---|---|
| 8,902,231 B2* | 12/2014 | Heinkel | G06T 11/206 345/440 |
| 8,917,274 B2 | 12/2014 | Ma et al. | |
| 8,924,388 B2 | 12/2014 | Elliot et al. | |
| 8,924,389 B2 | 12/2014 | Elliot et al. | |
| 8,924,872 B1 | 12/2014 | Bogomolov et al. | |
| 8,933,937 B2* | 1/2015 | Nachmanson | G06T 11/20 345/440 |
| 8,937,619 B2 | 1/2015 | Sharma et al. | |
| 8,938,686 B1 | 1/2015 | Erenrich et al. | |
| 9,275,118 B2* | 3/2016 | Brezina | H04M 15/00 |
| 9,286,380 B2* | 3/2016 | Dowlaty | G06Q 50/01 |
| 2001/0021936 A1 | 9/2001 | Bertram | |
| 2002/0033848 A1 | 3/2002 | Sciammarella et al. | |
| 2002/0065708 A1 | 5/2002 | Senay et al. | |
| 2002/0091707 A1 | 7/2002 | Keller | |
| 2002/0095360 A1 | 7/2002 | Joao | |
| 2002/0095658 A1 | 7/2002 | Shulman | |
| 2002/0103705 A1 | 8/2002 | Brady | |
| 2002/0116120 A1 | 8/2002 | Ruiz et al. | |
| 2002/0130907 A1 | 9/2002 | Chi et al. | |
| 2002/0147805 A1 | 10/2002 | Leshem et al. | |
| 2002/0174201 A1 | 11/2002 | Ramer et al. | |
| 2003/0028560 A1 | 2/2003 | Kudrolli et al. | |
| 2003/0039948 A1 | 2/2003 | Donahue | |
| 2003/0144868 A1 | 7/2003 | MacIntyre et al. | |
| 2003/0163352 A1 | 8/2003 | Surpin et al. | |
| 2003/0200217 A1 | 10/2003 | Ackerman | |
| 2003/0225755 A1 | 12/2003 | Iwayama et al. | |
| 2003/0229848 A1 | 12/2003 | Arend et al. | |
| 2004/0032432 A1 | 2/2004 | Baynger | |
| 2004/0034570 A1 | 2/2004 | Davis | |
| 2004/0064256 A1 | 4/2004 | Barinek et al. | |
| 2004/0085318 A1 | 5/2004 | Hassler et al. | |
| 2004/0095349 A1 | 5/2004 | Bito et al. | |
| 2004/0111410 A1 | 6/2004 | Burgoon et al. | |
| 2004/0126840 A1 | 7/2004 | Cheng et al. | |
| 2004/0143602 A1 | 7/2004 | Ruiz et al. | |
| 2004/0153418 A1 | 8/2004 | Hanweck | |
| 2004/0163039 A1 | 8/2004 | Gorman | |
| 2004/0181554 A1 | 9/2004 | Heckerman et al. | |
| 2004/0193600 A1 | 9/2004 | Kaasten et al. | |
| 2004/0260702 A1 | 12/2004 | Cragun et al. | |
| 2005/0010472 A1 | 1/2005 | Quatse et al. | |
| 2005/0027705 A1 | 2/2005 | Sadri et al. | |
| 2005/0028094 A1 | 2/2005 | Allyn | |
| 2005/0080769 A1 | 4/2005 | Gemmell | |
| 2005/0086207 A1 | 4/2005 | Heuer et al. | |
| 2005/0125715 A1 | 6/2005 | Franco et al. | |
| 2005/0162523 A1 | 7/2005 | Darrell et al. | |
| 2005/0180330 A1* | 8/2005 | Shapiro | G06T 11/206 370/241 |
| 2005/0182793 A1 | 8/2005 | Keenan et al. | |
| 2005/0246327 A1 | 11/2005 | Yeung et al. | |
| 2005/0251786 A1 | 11/2005 | Citron et al. | |
| 2006/0026120 A1 | 2/2006 | Carolan et al. | |
| 2006/0026170 A1 | 2/2006 | Kreitler et al. | |
| 2006/0045470 A1 | 3/2006 | Poslinski et al. | |
| 2006/0059139 A1 | 3/2006 | Robinson | |
| 2006/0074866 A1 | 4/2006 | Chamberlain et al. | |
| 2006/0074881 A1 | 4/2006 | Vembu et al. | |
| 2006/0080619 A1 | 4/2006 | Carlson et al. | |
| 2006/0129746 A1 | 6/2006 | Porter | |
| 2006/0139375 A1 | 6/2006 | Rasmussen et al. | |
| 2006/0142949 A1 | 6/2006 | Helt | |
| 2006/0143075 A1 | 6/2006 | Carr et al. | |
| 2006/0143079 A1 | 6/2006 | Basak et al. | |
| 2006/0149596 A1 | 7/2006 | Surpin et al. | |
| 2006/0203337 A1 | 9/2006 | White | |
| 2006/0218637 A1 | 9/2006 | Thomas et al. | |
| 2006/0241974 A1 | 10/2006 | Chao et al. | |
| 2006/0242040 A1 | 10/2006 | Rader et al. | |
| 2006/0242630 A1 | 10/2006 | Koike et al. | |
| 2006/0271277 A1 | 11/2006 | Hu et al. | |
| 2006/0279630 A1 | 12/2006 | Aggarwal et al. | |
| 2007/0000999 A1 | 1/2007 | Kubo et al. | |
| 2007/0011150 A1 | 1/2007 | Frank | |
| 2007/0011304 A1 | 1/2007 | Error | |
| 2007/0016363 A1 | 1/2007 | Huang et al. | |
| 2007/0038962 A1 | 2/2007 | Fuchs et al. | |
| 2007/0057966 A1 | 3/2007 | Ohno et al. | |
| 2007/0078832 A1 | 4/2007 | Ott et al. | |
| 2007/0083541 A1 | 4/2007 | Fraleigh et al. | |
| 2007/0174760 A1 | 7/2007 | Chamberlain et al. | |
| 2007/0192265 A1 | 8/2007 | Chopin et al. | |
| 2007/0208497 A1 | 9/2007 | Downs et al. | |
| 2007/0208498 A1 | 9/2007 | Barker et al. | |
| 2007/0208736 A1 | 9/2007 | Tanigawa et al. | |
| 2007/0240062 A1 | 10/2007 | Christena et al. | |
| 2007/0266336 A1 | 11/2007 | Nojima et al. | |
| 2007/0284433 A1 | 12/2007 | Domenica et al. | |
| 2007/0294643 A1 | 12/2007 | Kyle | |
| 2008/0040684 A1 | 2/2008 | Crump | |
| 2008/0051989 A1 | 2/2008 | Welsh | |
| 2008/0052142 A1 | 2/2008 | Bailey et al. | |
| 2008/0069081 A1 | 3/2008 | Chand et al. | |
| 2008/0077597 A1 | 3/2008 | Butler | |
| 2008/0077642 A1 | 3/2008 | Carbone et al. | |
| 2008/0094399 A1* | 4/2008 | Heinkel | G06T 11/206 345/440 |
| 2008/0104019 A1 | 5/2008 | Nath | |
| 2008/0126951 A1 | 5/2008 | Sood et al. | |
| 2008/0155440 A1 | 6/2008 | Trevor et al. | |
| 2008/0162616 A1 | 7/2008 | Gross et al. | |
| 2008/0195417 A1 | 8/2008 | Surpin et al. | |
| 2008/0195608 A1 | 8/2008 | Clover | |
| 2008/0222295 A1 | 9/2008 | Robinson et al. | |
| 2008/0255973 A1 | 10/2008 | El Wade et al. | |
| 2008/0263468 A1 | 10/2008 | Cappione et al. | |
| 2008/0267107 A1 | 10/2008 | Rosenberg | |
| 2008/0276167 A1 | 11/2008 | Michael | |
| 2008/0278311 A1 | 11/2008 | Grange et al. | |
| 2008/0288306 A1 | 11/2008 | MacIntyre et al. | |
| 2008/0301643 A1 | 12/2008 | Appleton et al. | |
| 2008/0313132 A1 | 12/2008 | Hao et al. | |
| 2009/0002492 A1 | 1/2009 | Velipasalar et al. | |
| 2009/0027418 A1 | 1/2009 | Maru et al. | |
| 2009/0030915 A1 | 1/2009 | Winter et al. | |
| 2009/0055251 A1 | 2/2009 | Shah et al. | |
| 2009/0076845 A1 | 3/2009 | Bellin et al. | |
| 2009/0083261 A1* | 3/2009 | Nagano | G06F 17/30864 |
| 2009/0088964 A1 | 4/2009 | Schaaf et al. | |
| 2009/0094166 A1 | 4/2009 | Aymeloglu et al. | |
| 2009/0106178 A1 | 4/2009 | Chu | |
| 2009/0112745 A1 | 4/2009 | Stefanescu | |
| 2009/0119309 A1 | 5/2009 | Gibson et al. | |
| 2009/0125369 A1 | 5/2009 | Kloosstra et al. | |
| 2009/0125459 A1 | 5/2009 | Norton et al. | |
| 2009/0132921 A1 | 5/2009 | Hwangbo et al. | |
| 2009/0132953 A1 | 5/2009 | Reed et al. | |
| 2009/0144262 A1 | 6/2009 | White et al. | |
| 2009/0144274 A1 | 6/2009 | Fraleigh et al. | |
| 2009/0164934 A1 | 6/2009 | Bhattiprolu et al. | |
| 2009/0171939 A1 | 7/2009 | Athsani et al. | |
| 2009/0172511 A1 | 7/2009 | Decherd et al. | |
| 2009/0177962 A1 | 7/2009 | Gusmorino et al. | |
| 2009/0179892 A1 | 7/2009 | Tsuda et al. | |
| 2009/0187546 A1 | 7/2009 | Hamilton Whyte | |
| 2009/0187548 A1 | 7/2009 | Ji et al. | |
| 2009/0222400 A1 | 9/2009 | Kupershmidt et al. | |
| 2009/0222760 A1 | 9/2009 | Halverson et al. | |
| 2009/0234720 A1 | 9/2009 | George et al. | |
| 2009/0249244 A1 | 10/2009 | Robinson et al. | |
| 2009/0271343 A1 | 10/2009 | Vaiciulis et al. | |
| 2009/0281839 A1 | 11/2009 | Lynn et al. | |
| 2009/0287470 A1 | 11/2009 | Farnsworth et al. | |
| 2009/0292626 A1 | 11/2009 | Oxford | |
| 2009/0313463 A1 | 12/2009 | Pang et al. | |
| 2009/0315890 A1* | 12/2009 | Modani | G06Q 10/10 345/440 |
| 2009/0319418 A1 | 12/2009 | Herz | |
| 2010/0011282 A1 | 1/2010 | Dollard et al. | |
| 2010/0042922 A1 | 2/2010 | Bradateanu et al. | |
| 2010/0057622 A1 | 3/2010 | Faith et al. | |

(56) References Cited

U.S. PATENT DOCUMENTS

| | | |
|---|---|---|
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070897 A1 | 3/2010 | Aymeloglu et al. |
| 2010/0088273 A1* | 4/2010 | Donaldson ............ G06Q 10/10 707/609 |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0313157 A1* | 12/2010 | Carlsson ............ G06F 17/30604 715/769 |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0047159 A1 | 2/2011 | Baid et al. |
| 2011/0060717 A1* | 3/2011 | Forman ............ G06F 17/30867 706/54 |
| 2011/0060753 A1 | 3/2011 | Shaked et al. |
| 2011/0061013 A1 | 3/2011 | Bilicki et al. |
| 2011/0072052 A1* | 3/2011 | Skarin .................... G06Q 10/10 707/794 |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0258158 A1 | 10/2011 | Resende et al. |
| 2011/0270604 A1 | 11/2011 | Qi et al. |
| 2011/0270705 A1 | 11/2011 | Parker |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0011238 A1 | 1/2012 | Rathod |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0173381 A1 | 7/2012 | Smith |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0278321 A1* | 11/2012 | Traub ................ G06F 17/30657 707/736 |
| 2012/0278327 A1* | 11/2012 | Nakazawa ........ G06F 17/30696 707/737 |
| 2012/0290672 A1* | 11/2012 | Robinson ............... G06Q 10/10 709/206 |
| 2012/0290879 A1 | 11/2012 | Shibuya et al. |
| 2012/0296907 A1 | 11/2012 | Long et al. |
| 2012/0323888 A1 | 12/2012 | Osann, Jr. |
| 2012/0330973 A1 | 12/2012 | Ghuneim et al. |
| 2013/0006725 A1 | 1/2013 | Simanek et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0096988 A1 | 4/2013 | Grossman et al. |
| 2013/0097482 A1 | 4/2013 | Marantz et al. |
| 2013/0111320 A1 | 5/2013 | Campbell et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0151453 A1 | 6/2013 | Bhanot et al. |
| 2013/0157234 A1 | 6/2013 | Gulli et al. |
| 2013/0166480 A1 | 6/2013 | Popescu et al. |
| 2013/0176321 A1 | 7/2013 | Mitchell et al. |
| 2013/0179420 A1 | 7/2013 | Park et al. |
| 2013/0185307 A1 | 7/2013 | El-Yaniv et al. |
| 2013/0224696 A1 | 8/2013 | Wolfe et al. |
| 2013/0232452 A1* | 9/2013 | Krajec ................. G06F 3/0482 715/840 |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0282889 A1* | 10/2013 | Tito ...................... H04L 41/22 709/224 |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0311375 A1 | 11/2013 | Priebatsch |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0059038 A1 | 2/2014 | McPherson et al. |
| 2014/0068487 A1 | 3/2014 | Steiger et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0136557 A1* | 5/2014 | Lilienthal ......... G06F 17/30424 707/754 |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214945 A1* | 7/2014 | Zhang .................. H04L 67/306 709/204 |

(56) References Cited

U.S. PATENT DOCUMENTS

| | | | |
|---|---|---|---|
| 2014/0218383 A1* | 8/2014 | Srivastava | G06T 11/206 345/589 |
| 2014/0222793 A1 | 8/2014 | Sadkin et al. | |
| 2014/0249841 A1* | 9/2014 | Seward | G06F 19/3431 705/2 |
| 2014/0267294 A1 | 9/2014 | Ma | |
| 2014/0267295 A1 | 9/2014 | Sharma | |
| 2014/0279824 A1 | 9/2014 | Tamayo | |
| 2014/0297690 A1* | 10/2014 | Osoekawa | G06Q 10/067 707/798 |
| 2014/0316911 A1 | 10/2014 | Gross | |
| 2014/0333651 A1 | 11/2014 | Cervelli et al. | |
| 2014/0337772 A1 | 11/2014 | Cervelli et al. | |
| 2014/0351267 A1* | 11/2014 | Kumar | G06K 9/6224 707/748 |
| 2014/0366132 A1 | 12/2014 | Stiansen et al. | |
| 2014/0372953 A1* | 12/2014 | Laurance | G06F 19/26 715/835 |
| 2015/0019394 A1 | 1/2015 | Unser et al. | |
| 2015/0046870 A1 | 2/2015 | Goldenberg et al. | |
| 2015/0089424 A1 | 3/2015 | Duffield et al. | |
| 2015/0220535 A1* | 8/2015 | Palmer | G06F 17/3053 707/749 |

FOREIGN PATENT DOCUMENTS

| | | |
|---|---|---|
| DE | 102014204827 | 9/2014 |
| DE | 102014204830 | 9/2014 |
| DE | 102014204834 | 9/2014 |
| DE | 102014215621 | 2/2015 |
| EP | 1672527 | 6/2006 |
| EP | 2551799 | 1/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| GB | 2516155 | 1/2015 |
| GB | 2518745 | 4/2015 |
| NL | 2012778 | 11/2014 |
| NL | 2013306 | 2/2015 |
| WO | WO 00/09529 | 2/2000 |
| WO | WO 2005/104736 | 11/2005 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |

OTHER PUBLICATIONS

Acklen, Laura, "Absolute Beginner's Guide to Microsoft Word 2003," Dec. 24, 2003, pp. 15-18, 34-41, 308-316.
Ananiev et al., "The New Modality API," http://web.archive.org/web/20061211011958/http://java.sun.com/developer/technicalArticles/J2SE/Desktop/javase6/modality/ Jan. 2006, pp. 8.
APPPACTS, "Smart Thinking for Super Apps," http://www.appacts.com printed Jul. 18, 2013 in 4 pages.
APSALAR, "Data Powered Mobile Advertising," "Free Mobile App Analytics" and various analytics related screen shots http://apsalar.com Printed Jul. 18, 2013 in 8 pages.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Capptain—Pilot Your Apps, http://www.capptain.com Printed Jul. 18, 2013 in 6 pages.
Chen et al., "Bringing Order to the Web: Automatically Categorizing Search Results," CHI '00, Proceedings of the SIGCHI conference on Human Factors in Computing Systems, pp. 145-152.
Countly Mobile Analytics, http://count.ly/ Printed Jul. 18, 2013 in 9 pages.
DISTIMO—App Analytics, http://www.distimo.com/app-analytics Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Flurry Analytics, http://www.flurry.com/ Printed Jul. 18, 2013 in 14 pages.
GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Google Analytics Official Website—Web Analytics & Reporting, http://www.google.com/analytics.index.html Printed Jul. 18, 2013 in 22 pages.
Griffith, Daniel A., "A Generalized Huff Model," Geographical Analysis, Apr. 1982, vol. 14, No. 2, pp. 135-144.
Hibbert et al., "Prediction of Shopping Behavior Using a Huff Model Within a GIS Framework," Healthy Eating in Context Mar. 18, 2011, pp. 16.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kontagent Mobile Analytics, http://www.kontagent.com/ Printed Jul. 18, 2013 in 9 pages.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, http://www.localytics.com/ Printed Jul. 18, 2013 in 12 pages.
Manske, "File Saving Dialogs," http://www.mozilla.org/editor/ui_specs/FileSaveDialogs.html, Jan. 20, 1999, pp. 7.
Map of San Jose, CA. Retrieved Oct. 2, 2013 from http://maps.google.com.
Map of San Jose, CA. Retrieved Oct. 2, 2013 from http://maps.bing.com.
Map of San Jose, CA. Retrieved Oct. 2, 2013 from http://maps.yahoo.com.
Mixpanel—Mobile Analytics, https://mixpanel.com/ Printed Jul. 18, 2013 in 13 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Open Web Analytics (OWA), http://www.openwebanalytics.com/ Printed Jul. 19, 2013 in 5 pages.
Piwik—Free Web Analytics Software. http://piwik.org/ Printed Jul. 19, 2013 in18 pages.
StatCounter—Free Invisible Web Tracker, Hit Counter and Web Stats, http://statcounter.com/ Printed Jul. 19, 2013 in 17 pages.
TestFlight—Beta Testing on the Fly, http://testflightapp.com/ Printed Jul. 18, 2013 in 3 pages.
trak.io, http://trak.io/ printed Jul. 18, 2013 in 3 pages.
UserMetrix, http://usermetrix.com/android-analytics printed Jul. 18, 2013 in 3 pages.
"A Quick Guide to UniProtKB Swiss-Prot & TrEMBL," Sep. 2011, pp. 2.
Bluttman et al., "Excel Formulas and Functions for Dummies," 2005, Wiley Publishing, Inc., pp. 280, 284-286.
Canese et al., "Chapter 2: PubMed: The Bibliographic Database," The NCBI Handbook, Oct. 2002, pp. 1-10.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Conner, Nancy, "Google Apps: The Missing Manual," May 1, 2008, pp. 15.

(56) References Cited

OTHER PUBLICATIONS

Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Gorr et al., "Crime Hot Spot Forecasting: Modeling and Comparative Evaluation", Grant 98-IJ-CX-K005, May 6, 2002, 37 pages.
Goswami, Gautam, "Quite Writly Said!," One Brick at a Time, Aug. 21, 2005, pp. 7.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HiPC 2006, LNCS 4297, pp. 277-288, 2006.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Kitts, Paul, "Chapter 14: Genome Assembly and Annotation Process," The NCBI Handbook, Oct. 2002, pp. 1-21.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents", University of Michigan, 2002, 6 pages.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Palmas et al., "An Edge-Bunding Layout for Interactive Parallel Coordinates" 2014 IEEE Pacific Visualization Symposium, pp. 57-64.
Rouse, Margaret, "OLAP Cube," http://searchdatamanagement.techtarget.com/definition/OLAP-cube Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wikipedia, "Federated Database System," Sep. 7, 2013, retrieved from the internet on Jan. 27, 2015 http://en.wikipedia.org/w/index.php?title=Federated_database_system&oldid=571954221.
Yang et al., "HTML Page Analysis Based on Visual Cues", A129, pp. 859-864, 2001.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/192,767 dated Dec. 16, 2014.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/473,860 dated Jan. 5, 2015.
Official Communication for Australian Patent Application No. 2014201511 dated Feb. 27, 2015.
Official Communication for Australian Patent Application No. 2014202442 dated Mar. 19, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14186225.0 dated Feb. 13, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14199182.8 dated Mar. 13, 2015.
Official Communication for Great Britain Patent Application No. 1404457.2 dated Aug. 14, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for New Zealand Patent Application No. 622473 dated Jun. 19, 2014.
Official Communication for New Zealand Patent Application No. 622473 dated Mar. 27, 2014.

(56) References Cited

OTHER PUBLICATIONS

Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 13/827,491 dated Dec. 1, 2014.
Official Communication for U.S. Appl. No. 13/831,791 dated Mar. 4, 2015.
Official Communication for U.S. Appl. No. 14/148,568 dated Oct. 22, 2014.
Official Communication for U.S. Appl. No. 14/225,006 dated Sep. 10, 2014.
Official Communication for U.S. Appl. No. 14/225,006 dated Feb. 27, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,599 dated Jul. 22, 2014.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,147 dated Feb. 19, 2015.
Official Communication for U.S. Appl. No. 14/306,147 dated Sep. 9, 2014.
Official Communication for U.S. Appl. No. 14/306,154 dated Mar. 11, 2015.
Official Communication for U.S. Appl. No. 14/306,154 dated Sep. 9, 2014.
Official Communication for U.S. Appl. No. 14/319,161 dated Jan. 23, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Mar. 31, 2015.
Official Communication for U.S. Appl. No. 14/451,221 dated Oct. 21, 2014.
Official Communication for U.S. Appl. No. 14/463,615 dated Nov. 13, 2014.
Official Communication for U.S. Appl. No. 14/463,615 dated Jan. 28, 2015.
Official Communication for U.S. Appl. No. 14/473,552 dated Feb. 24, 2015.
Official Communication for U.S. Appl. No. 14/479,863 dated Dec. 26, 2014.
Official Communication for U.S. Appl. No. 14/483,527 dated Jan. 28, 2015.
Official Communication for U.S. Appl. No. 14/486,991 dated Mar. 10, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/571,098 dated Mar. 11, 2015.

* cited by examiner

Article Information

Example Article 8

Section:magazine

Exits

- Total Exits: 17 (3.6% of uniques)
- Total Uniques: 470
- Total Views: 559

Gender of Views

- Unknown          10 (2.1%)
- Male             259 (55.1%)
- Female           159 (33.8%)

Age of Views

- Younger than 30    76 (16.2%)
- 30 to 39           83 (17.7%)
- 40 to 49           79 (16.8%)
- 50 to 59           106 (22.6%)
- 60 to 69           59 (12.6%)
- 70 to 79           14 (3.0%)
- Older than 80      3 (0.6%)
- Unknown            8 (1.7%)

Gender of Exits

- Unknown          2 (11.8%)
- Male             7 (41.2%)
- Female           8 (47.1%)

Age of Exits

- Younger than 30    3 (17.6%)
- 30 to 39           4 (23.5%)
- 40 to 49           0 (0.0%)
- 50 to 59           6 (35.3%)
- 60 to 69           1 (5.9%)
- 70 to 79           1 (5.9%)
- Older than 80      0 (0.0%)
- Unknown            2 (11.8%)

Transition Information

From: Example Article 8
To: Example Article 12

Counts

| | |
|---|---|
| Total | 81 |
| Total Skips | 52 (64.2% of total) |

Times

| | |
|---|---|
| Mean time | 780 seconds |
| Median time | 7 seconds |
| Mean time (ignoring skips) | 1318.3 seconds |
| Median time (ignoring skips) | 12.0 seconds |

Gender

- Unknown          1 (1.2%)
- Male             56 (69.1%)
- Female           24 (29.6%)

Age

- Younger than 30   16 (19.8%)
- 30 to 39          29 (35.8%)
- 40 to 49          17 (21.0%)
- 50 to 59          13 (16.0%)
- 60 to 69          2 (2.5%)
- 70 to 79          undefined (NaN%)
- Older than 80     1 (1.2%)
- Unknown           3 (3.7%)

FIG. 6B

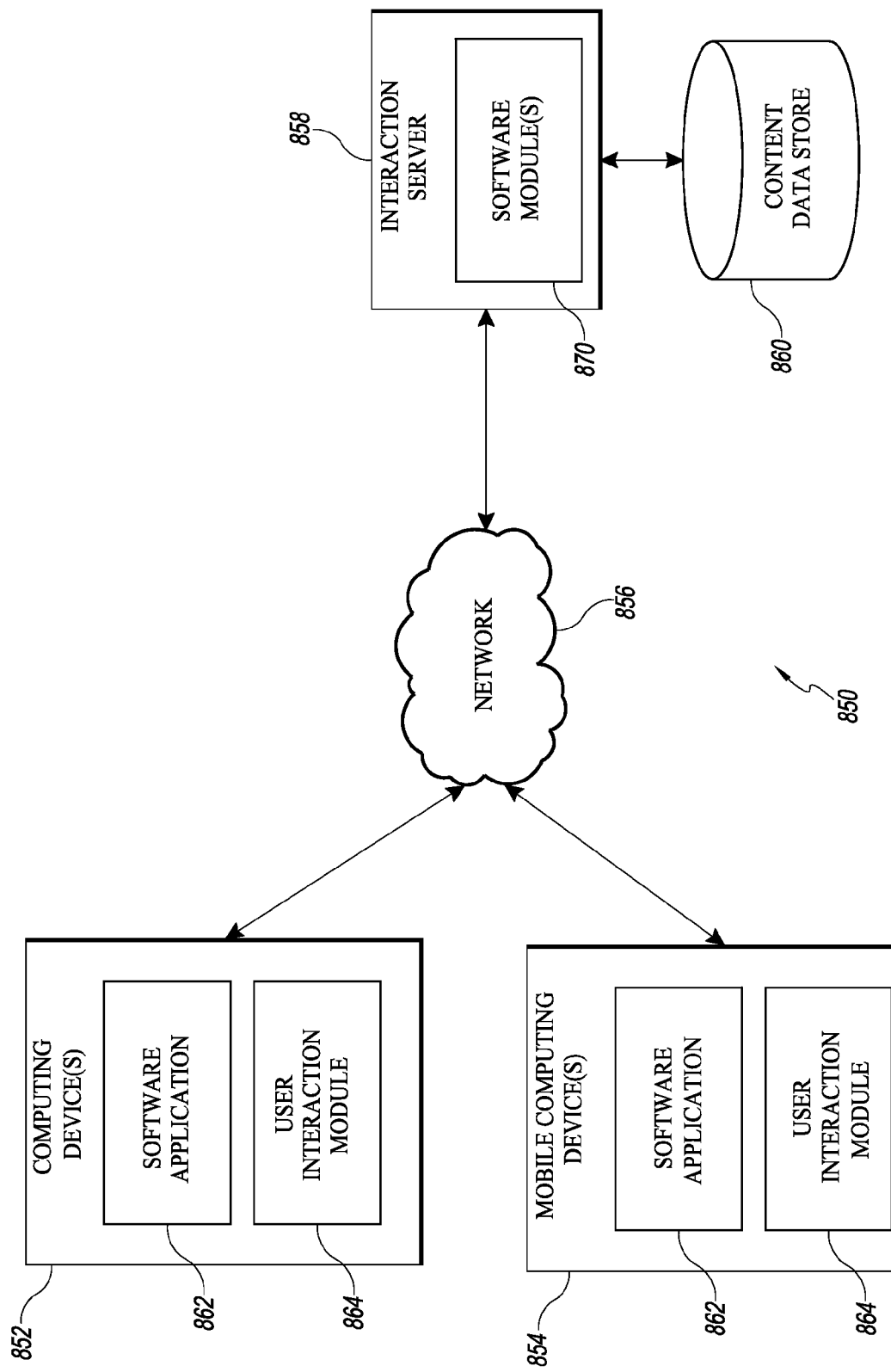

PRESENTATION AND ANALYSIS OF USER INTERACTION DATA

CROSS-REFERENCE TO RELATED APPLICATIONS

This application is a continuation of U.S. application Ser. No. 14/035,889, filed Sep. 24, 2013, and titled "PRESENTATION AND ANALYSIS OF USER INTERACTION DATA", the entirety of which is hereby incorporated by reference herein in its entirety.

TECHNICAL FIELD

The present disclosure relates to systems and techniques for user data integration, analysis, and visualization. More specifically, the present disclosure relates to user interaction data integration, analysis, presentation, and visualization.

BACKGROUND

In the area of computer-based platforms, user interaction data may be collected, analyzed, and/or presented with the goal of improving particular aspects of user interactions. For example, in a web-based context, user interaction data may include various metrics including the time a user visits a web page, the length of time the user spends on the web page, the number of times a user visits the web page over some length of time, the source from which the user came to the web page, the destination of the user after leaving the web page, and/or various interactions of the user with the web page, among others. Such user data may be aggregated across many users. The user interaction data may then be analyzed and presented to, for example, an operator. In general, the term analytics may describe the process of user interaction data collection, analysis, and presentation so as to provide insights.

SUMMARY

The systems, methods, and devices described herein each have several aspects, no single one of which is solely responsible for its desirable attributes. Without limiting the scope of this disclosure, several non-limiting features will now be discussed briefly.

The systems, methods, and devices of the present disclosure provide, among other features, an interactive, graph-based user interaction data analysis system ("the system") configured to provide analysis and visualizations of user interaction data to a system operator. In various embodiments, interactive visualizations and analyses provided by the system may be based on user interaction data aggregated across particular groups of users, across particular time frames, and/or from particular computer-based platforms or applications. According to various embodiments, the system may enable insights into, for example, user interaction patterns and/or ways to optimize for desired user interactions, among others.

According to an embodiment, a computer system is disclosed comprising: one or more computer readable storage devices configured to store: one or more software modules including computer executable instructions; and one or more sets of user interaction data, each of the one or more sets of user interaction data collected from interactions of users with respective content items provided through one or more platforms, the one or more platforms comprising software applications configured to provide the content items to respective users; and one or more hardware computer processors in communication with the one or more computer readable storage devices and configured to execute the one or more software modules in order to cause the computer system to: access a particular set of user interaction data associated with a particular platform, the particular set of user interaction data representing interactions of multiple users with respective content items provided through the particular platform; generate, based on the accessed particular set of user interaction data, an interactive user interface configured for display on an electronic display of the computer system, the interactive user interface including at least a graph including: two or more nodes each representing respective content items, and at least one edge connecting respective nodes as an indication of user transitions between the respective nodes, wherein locations of the two or more nodes of the graph on the interactive user interface are automatically determined based on at least one of repulsive forces associated with each of the two or more nodes or contractive forces associated with each of the at least one edge.

According to an aspect, the two or more nodes and the at least one edge may be individually selectable by an operator of the computer system, and, in response to selection of at least one of the two or more nodes or one of the at least one edge, the computer system may be further configured to: update the interactive user interface to further include one or more metrics based on interactions of users represented by the selected at least one of the two or more nodes or the at least one edge.

According to another aspect, accessing the particular set of user interaction data associated with the particular platform may further comprise accessing user interaction data associated with a particular timeframe.

According to yet another aspect, the repulsive force associated with each of the two or more nodes may be based on a number of users interacting with content items represented by respective nodes.

According to another aspect, at least one of the repulsive forces associated with the two or more nodes or the contractive forces associated with the at least one edge may be adjustable by an operator.

According to yet another aspect, the contractive forces associated with each of the at least one edge may be based on a number of user transitions from one content item to another content item represented by each respective edge.

According to another aspect, each of the two or more nodes may represent interactions of users with content items, wherein the content items comprise articles, and wherein the represented interactions include at least a number of user visits to a particular article of the particular platform.

According to yet another aspect, the computer system may be further configured to: in response to receiving an input from an operator of the computing system selecting to view an article table, display on the user interface an article table including a list of articles and associated metrics.

According to another aspect, each of the two or more nodes may represent interactions of users with content items, wherein the content items comprise sections, and wherein the represented interactions include at least user visits to a particular section of the particular platform, wherein the particular section includes one or more pages of the particular platform.

According to yet another aspect, the one or more platforms may include at least one of a smartphone app, a tablet app, or a web app.

According to another aspect, each at least one edge may be directional and curved.

According to another embodiment, a computer system is disclosed comprising: one or more computer readable storage devices configured to store: one or more software modules including computer executable instructions; and one or more sets of user interaction data collected from interactions of users with respective content items provided through a software application configured to provide the content items to respective users; and one or more hardware computer processors in communication with the one or more computer readable storage devices and configured to execute the one or more software modules in order to cause the computer system to: generate, based on a particular set of user interaction data, a user interface including a graph comprising nodes and at least one edge, the nodes representing respective content items, the at least one edge connecting respective nodes and indicating user transitions between the respective nodes; receive, at the user interface, one or more inputs from an operator of the computer system; and in response to the one or more inputs, dynamically updating the graph.

According to an aspect, further in response to the one or more inputs, the computer system may be further configured to update the graph by at least one of: adding nodes and/or edges, removing nodes and/or edges, and adjusting locations of the nodes and/or edges.

According to another aspect, the computer system may be further configured to: in response to receiving an input from the operator indicating selection of a transition display threshold, determine, for each at least one edge, a number of user transitions represented by that edge; and in response to the number of user transitions represented by a particular edge being less than the selected transition display threshold, not display the particular edge in the graph.

According to yet another aspect, the computer system may be further configured to: in response to receiving an input from the operator indicating selection of an animation option associated with a particular selected node, successively adding edges and nodes to the graph in an animated fashion, wherein each successively added node represents a most common user destination from a previously added node.

According to another aspect, the graph may comprise a force-directed graph, and the graph is configured to automatically and/or fluidly adjust to an optimal view according to a force-directed graph drawing algorithm.

According to yet another aspect, the content items may include at least one of news content, textual content, visual content, audio content, or video content.

According to another aspect, each node may include a fill color and/or a border color based on one or more user interactions associated with the node.

According to yet another aspect, each node may be sized based on one or more user interactions associated with the node.

According to yet another embodiment, a computer system is disclosed comprising: one or more computer readable storage devices configured to store: one or more software modules including computer executable instructions; and one or more sets of user interaction data, each of the one or more sets of user interaction data collected from interactions of users with respective content items provided through one or more platforms, the one or more platforms comprising software applications configured to provide the content items to respective users; and one or more hardware computer processors in communication with the one or more computer readable storage devices and configured to execute the one or more software modules in order to cause the computer system to: generate, based on at least one of the one or more sets of user interaction data, a user interface including at least one graph comprising nodes and at least one edge, the nodes representing respective content items, the at least one edge connecting respective nodes and indicating user transitions between the respective nodes, wherein an operator of the computer system may interact with the at least one graph in order to determine one or more user interaction patterns associated with the one or more platforms.

BRIEF DESCRIPTION OF THE DRAWINGS

The following aspects of the disclosure will become more readily appreciated as the same become better understood by reference to the following detailed description, when taken in conjunction with the accompanying drawings.

FIGS. 6A-6B illustrate sample information sidebars of the user interaction data analysis system, according to embodiments of the present disclosure.

FIGS. 8A-8B illustrate a network environment and computer systems and devices with which various methods and systems discussed herein may be implemented.

DETAILED DESCRIPTION OF SPECIFIC EMBODIMENTS

Figure 1A:
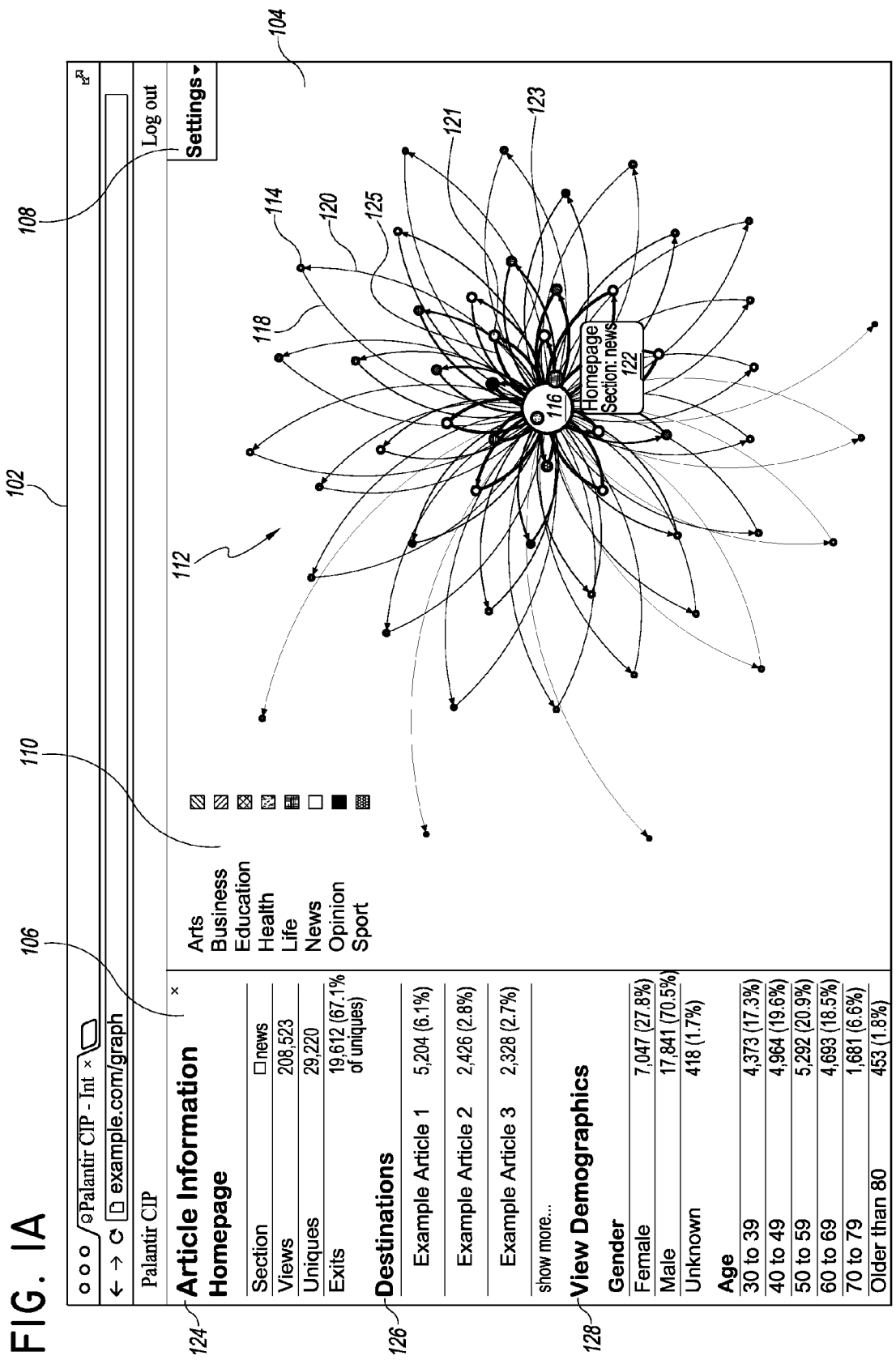
FIG. 1A illustrates a sample user interface of the user interaction data analysis system, according to an embodiment of the present disclosure.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms.

Thus, the definitions below do not limit the meaning of these terms, but only provide exemplary definitions.

Overview

An interactive, graph-based user interaction data analysis system ("the system") is disclosed. The system is configured to provide analysis and/or graphical visualizations of user interaction data to a system operator (or one or more operators). In various embodiments, interactive visualizations and analyses provided by the system may be based on user interaction data aggregated across particular groups of users, across particular time frames, and/or from particular computer-based platforms and/or applications. According to various embodiments, the system may enable insights into, for example, user interaction patterns and/or ways to optimize for desired user interactions, among others. In an embodiment, the system allows an operator to analyze and investigate user interactions with content provided via one or more computer-based platforms, software applications, and/or software application editions.

In an embodiment, data is collected by the system from user interactions at various computing devices and/or mobile computing devices. The system then processes the user interaction data and provides an interactive user interface to the operator through which the user interaction data may be displayed and inputs may be received. In an embodiment, the system comprises software including one or more software modules. The software modules may be stored on one or more media devices, and may be executable by one or more processors. The software modules may include modules for collecting user interaction data, processing the data, displaying a user interface to the operator of the system, and/or receiving inputs from the operator.

In an embodiment, the interactive user interface includes user interaction data displayed in the form of a two-dimensional force-directed graph consisting of nodes and edges. Nodes may generally represent pages and/or articles of content with which users have interacted. Edges may generally represent transitions of users from one page and/or article to another. In an embodiment, edges may be directional, meaning that the direction of the transition from source page/article to destination page/article may be represented by, for example, arrows. Nodes and edges may be colored, sized, and/or otherwise manipulated to provide insightful information, visualizations, and/or analysis regarding the user interaction data. For example, the relative size of a node may, for example, indicate the number of unique user visitors to the particular page/article associated with that node. In another example, the width of an edge may be sized in proportion to the number of users that transitioned from one associated page/article to the other. In an embodiment, a node and/or edge may be selected by the operator. Selection of a node and/or edge may cause display of user interaction data and/or metrics associated with that node and/or edge.

In an embodiment, the two-dimensional force-directed graph displayed in the user interface automatically and/or fluidly adjusts to an optimal view according to any force-directed graph drawing algorithm. For example, the graph may be generated such that all the edges are similar in length and there are as few crossing edges as possible. This may be accomplished by assigning repulsion forces among the set of nodes and/or contracting forces among the set of edges and, based on their relative positions, moving the edges and nodes to minimize their energy. In an embodiment, the forces assigned to the edges and/or nodes are proportional to one or more related user interaction metrics. For example, with respect to edges, the assigned edge force may be correlated with the number of users that transitioned along the edge. In an embodiment, the graph of the user interface may comprise a three-dimensional graph, and/or may comprise more than three dimensions or other types of graphs.

In an embodiment, the use of a force-directed graph (also referred to as a force layout) enables visualization and analysis of any type of generic structure or dataset. In various embodiments, other types of graphs and/or layouts may be implemented in the system. For example, other types of layouts may include trees, lines, plots, charts, maps, clusters, and/or diagrams.

In an embodiment, the graph may be manipulated by the operator. For example, the operator may move individual nodes and/or groups of nodes. In an embodiment, the graph may re-adjust automatically when a node or edge has been manipulated and/or moved. In an embodiment, the user may choose to freeze the graph so that the graph does not re-adjust when individual nodes and/or edges are manipulated or moved. In an example, nodes may be selectively added or removed by the operator. In another example, nodes may be automatically added to the graph based on some criteria in an animated fashion. In an embodiment, the operator may select an edge/transition display threshold that determines what edges are displayed in the graph. In another embodiment, the operator may set repulsion values that adjust the forces assigned to nodes and/or edges. In various embodiments, the graph may be manipulated by the operator in other ways.

Example User Interaction Data Sources

As an illustrative non-limiting example, the user interaction data analysis system may be useful for analysis of user interactions with news content provided by a media company. The media company may provide various types of news content that may be divided into representative sections including, for example, world, local, business, health, opinion, and/or arts, among others. The news content may generally be further divided into articles, for example.

In an embodiment, the same, or similar, news content may be accessible to readers (also referred to as "users") through various computer-based platforms (also referred to as "platforms," "applications," and/or "apps"). For example, the news content may be available to users through a software application running on a small mobile device (such as a smartphone or personal digital assistant), through a software application running on a larger mobile device (such as a tablet or other touch-enabled device), and/or through a web browser software application running on any computer-based device (such as a laptop or desktop computer), among others. In the present disclosure, the application running on a small mobile device may be referred to as the "smartphone app," the application running on the larger mobile device may be referred to as the "tablet app," and the web browser application may be referred to as the "web app."

In an embodiment, each platform (for example, the smartphone app, the tablet app, and/or the web app) may differ from the others in various ways. For example, in general, a web app may provide the news content to the user in a layout similar to a traditional print newspaper. For example, many different articles, article headlines, and/or article links may be displayed on a single page of the web app. Accordingly, the user may, for example, navigate directly from a news content homepage to any of many other article pages and/or section pages. In contrast, a tablet app may, for example, provide news content to the user in a layout more suitable to a smaller sized display screen. For example, only a few articles, headlines, and/or links may be displayed on a news content homepage (or any other page) on the tablet app.

Accordingly, the user may, for example, be restricted to navigating to one of only a few articles. For example, the tablet app may provide an interface in which a user may view a single article at a time and swipe from one to the next, the order of articles being predetermined. A smartphone app on the other hand, may, for example, provide news content to a user in a layout with similarities to each the web app and the tablet app. For example, a news content homepage in the smartphone app may display a longer list of articles, headlines, and/or links than the tablet app, but fewer than the web app. Further, the smartphone app may include a navigation interface that encourages the user to swipe from one article to the next (as in the tablet app), but does not require such a liner navigation (unlike the tablet app).

In various embodiments, the various combinations of platforms and apps providing user interaction data to the systems may differ in other ways not mentioned above. For example, the various platforms may display the content in different formats, sizes, and/or typefaces, among others. The various platforms may organize the content in different ways. The various platforms may further include different interaction options. For example, while a smartphone or tablet may generally include a touch interface and be navigable by touching the display/interface directly, a laptop (displaying the web app) may only be navigable with a mouse and cursor. In an embodiment, a particular platform may be navigable by voice, and/or by some other way.

Further, in various embodiments, more or fewer platforms may be available for users to access a particular set of content, and from which user interaction data may be provided to the system. For example, multiple platforms may be provided, each of which is optimized for use on a particular display size. In an embodiment, separate platforms may be provided for computer-based devices with, for example, a 3.5 inch display, a 4 inch display, a 5 inch display, a 7 inch display, a 10 inch display, 12 inch display, and/or a display larger than 12 inches. In yet another embodiment, platforms may be provided for particular display resolutions and/or dimensions. In another example, multiple versions of an app on a particular platform may be provided. Thus, two or more versions and/or editions of a smartphone app, for example, may be provided.

In an embodiment, data regarding user interactions with the news content on each of the platforms is collected. This data is generally referred to herein as user interaction data. Individual types of user interaction data are generally referred to herein as metrics. Various types of user interaction data and/or metrics that may be collected include, for example, the time a user visits/accesses/links to a particular page, the length of time the user spends on the particular page, the number of times a user visits the particular page over some length of time, the source from which the user came to the particular page, the destination of the user after leaving the particular page, and/or various interactions of the user with the particular page, among others. Additional metrics may include, for example, demographic information related to the user, the characteristics of the computer-based device the user is using, and/or the platform/app of the user, among others. Demographic information may include, for example, the user's age, the user's gender, and/or the user's location, among other. Aggregated metrics may include, for example, the number of unique visitors to a particular page over some length of time, the number of page views/refreshes over some length of time, the number of users exiting from a page to a non-tracked location (for example, out of the app) or tracked location (or some combination of the two) over some length of time, and/or the number of users skipping past a particular page over some length of time (where skipping past a page may be determined when a user remains on a page for less than some predefined short period of time, for example), among others.

In various embodiments, the system may receive user interaction data from types of content other than news content. For example, the system may be useful for analyzing user interactions with other types of textual content (e.g., social networking or other communication content), visual content (such as photographic content), audio content, and/or video content, among others. In an embodiment, the system may be used in connection with content from a financial institution. For example, the system may be used to analyze user interactions with a credit card signup application. Relevant analysis of user interactions in such an example may include, for example, determining the points at which users look for help, determining at which points users exit, and/or determining the points at which users have difficulty or take a long period of time to transition to a next step, among others.

Sample User Interface—Example Web App Graph

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

FIG. 1A illustrates a sample user interface of the user interaction data analysis system, according to an embodiment of the present disclosure. The user interface may be displayed in a browser window 102, and may include a graph display area 104 (including graph 112 and key 110), an article information sidebar 106, and a settings button 108. The functionality of the system as shown in FIG. 1A may be implemented in one or more computer modules and/or processors, as is described below with reference to FIGS. 8A-8B.

In the example of FIG. 1A, the graph 112 is a two-dimensional force-directed graph generated by the system based on aggregated web app user interaction data collected over the course of one day. The content comprises news content, as described in the example above. News content is used in many of the examples of the present disclosure for illustrative purposes, however, as noted above, the system may be used in various other types of content. As described above, the graph 112 includes nodes, for example nodes 114, 116, and 121 (represented as circles of various sizes in this figure), and edges, for example edges 118, 120, 125, and 123 (represented as lines of various thicknesses in this figure). In the graph 112, the nodes represent articles, while the edges represent user transitions from one article to another article.

As indicated by the key 110, various news content sections are represented in the graph 112. Each of the nodes of the graph 112 is filled with a pattern and/or color corresponding to its corresponding section (see FIG. 1B for an enlarged representation of the nodes with the patterns more distinguishable). For example, the operator has selected node 116, and, as indicated by the pop over 122, node 116 represents a homepage of the content, which falls under the News section of the content that is indicated by no fill color/pattern on the node 116. Further, because homepage 116 is selected, corresponding user interaction data and/or metrics are displayed in the article information sidebar 106. In an embodiment, a pop over (such as pop over 122) may be displayed when the operator hovers a cursor over (or otherwise selects) a node and/or edge of the graph. The pop over may display any information associated with the selected node and/or edge. For example, information included in a pop over may include an associated section, a page/article name (or other identifier), a transition source, a transition destination, and/or associated user metric information. Similarly, in an embodiment, associated user metric information may be displayed in the article information sidebar 106 when the operator hovers a cursor over (or otherwise selects, such as by right-clicking or pressing a particular key combination) a node and/or edge of the graph.

In the graph 112, each of the nodes is relatively sized based on the number of unique visitors/users the corresponding article received over the one day period represented. For example, the sizes of the nodes indicate that the homepage 116 received significantly more visitors than did the article represented by node 114. Similarly, while the article represented by node 121 received fewer visitors than did homepage 116, it received more visitors than did the article of node 114.

Additionally, in the graph 112, each of the edges' thickness is relatively sized based on the number of users/visitors transitioning from one article to another article. For example, the thickness of edges 123 and 125 as compared to edges 118 and 120 indicates that relatively more users transitioned between node 121 and the homepage node 116 than between node 114 and the homepage node 116. The direction of transition is also indicated by the arrows on the edges of the graph 112. For example, edge 120 indicates transitions to node 114, while edge 118 indicates transitions from node 114. The combination of variances in edge thickness and arrows indicating the direction of transitions may enable an operator to easily determine, for example, that more users transition to a particular article than transition away from the particular article. For example, the edge leading to a particular article may be thicker than the edge leading away from away from a particular article, indicating that at least a portion of the users that transition to the article either then exit the app, or exit to another location not presently represented on the graph. In an embodiment, more or fewer than one edge may lead to or from a particular node. The number of edges displayed on the graph may vary based on a number of factors including, for example, a transition display threshold (as described below in reference to FIGS. 1B and 10.

In the embodiment of FIG. 1A, the graph 112 may correspond to, for example, patterns of user interaction with a web app. As described above, user navigation of a web app may be nonlinear as, while the homepage of the web app may include many links to other pages/articles, each individual article may not include prominent direct links to, or other means of navigating directly to, other articles. A user may, for example, navigate the web app by jumping from the homepage to an article, and then back to the homepage to find another article. This behavior is reflected in the shape of the graph 112, and indeed the visualization provided by the graph 112 makes the user interaction pattern very clear to the operator.

The shape of the graph 112 is further influenced by the forces assigned to each of the edges. In the example of FIG. 1A, the force assigned to an edge is set to be correlated with the number of users making the related transition. Such an assignment of forces may, for example, cause nodes having relatively more transitions to and/or from one another to be relatively closer together than nodes having relatively fewer transitions to and/or from one another, in the displayed graph. For example, as shown in the graph 112, the nodes having more transitions to and from the homepage node 116 (as also indicated by the thicker lines) are positioned closest to the homepage node 116, while the nodes having fewer transitions to and from the homepage node 116 are positioned further from the homepage node 116.

As mentioned above, the article information sidebar 106 includes user interaction data and/or metrics associated with the currently selected node, homepage 116. At indicator 124, primary metrics associated with the selected article are displayed, including the article name ("Homepage"), the section to which the article belongs ("news"), the number of views the article has received over the time period currently being viewed (208,523), the number of unique visitors to the article page over the current time period (29,220), and the number of exits from the article over the current time period (19,612, comprising 67.1% of the unique visitors). In an embodiment, the exits may indicate any transitions from the selected section to any node not currently represented in the graph, to any location outside of the tracked pages/articles (for example, other pages that are not related to the currently tracked content), and/or a combination of the two. In an embodiment, the sidebar 106 may include any information relevant to the type of content being displayed. For example, in the case of pages (rather than articles), a page name and/or other content identifier may be displayed in the sidebar 106.

The article information sidebar 106 further includes destination information 126. As shown, a truncated list of the most common destinations of users transitioning from the selected article is displayed. Here, the most common destination is an article named "Example Article 1," with 5,204 users going there (comprising 6.1% of the exits from the article).

The article information sidebar 106 also includes, at indicator 128, aggregated demographic information (including gender, age, location, among others) related the users visiting the selected article. For the selected homepage node 116 of FIG. 1A, the breakdown of visitors' gender and age may be seen in the article information sidebar 106.

In an embodiment, the sidebar 106 may be customizable by the operator. In an embodiment, other information and/or metrics may be displayed on the sidebar including, for example, mean time spent, an exit type, and/or sources (indicating sources from which users transitioned to the current article/page), among others. In an embodiment, any of the information displayed may be expandable. For example, the operator may select a link to "show more . . . " or "view all sources," at which point a list of all the sources may be displayed. In various embodiments, other information and/or links may be included in the sidebar, as described in reference to the other figures below.

Figure 1B:
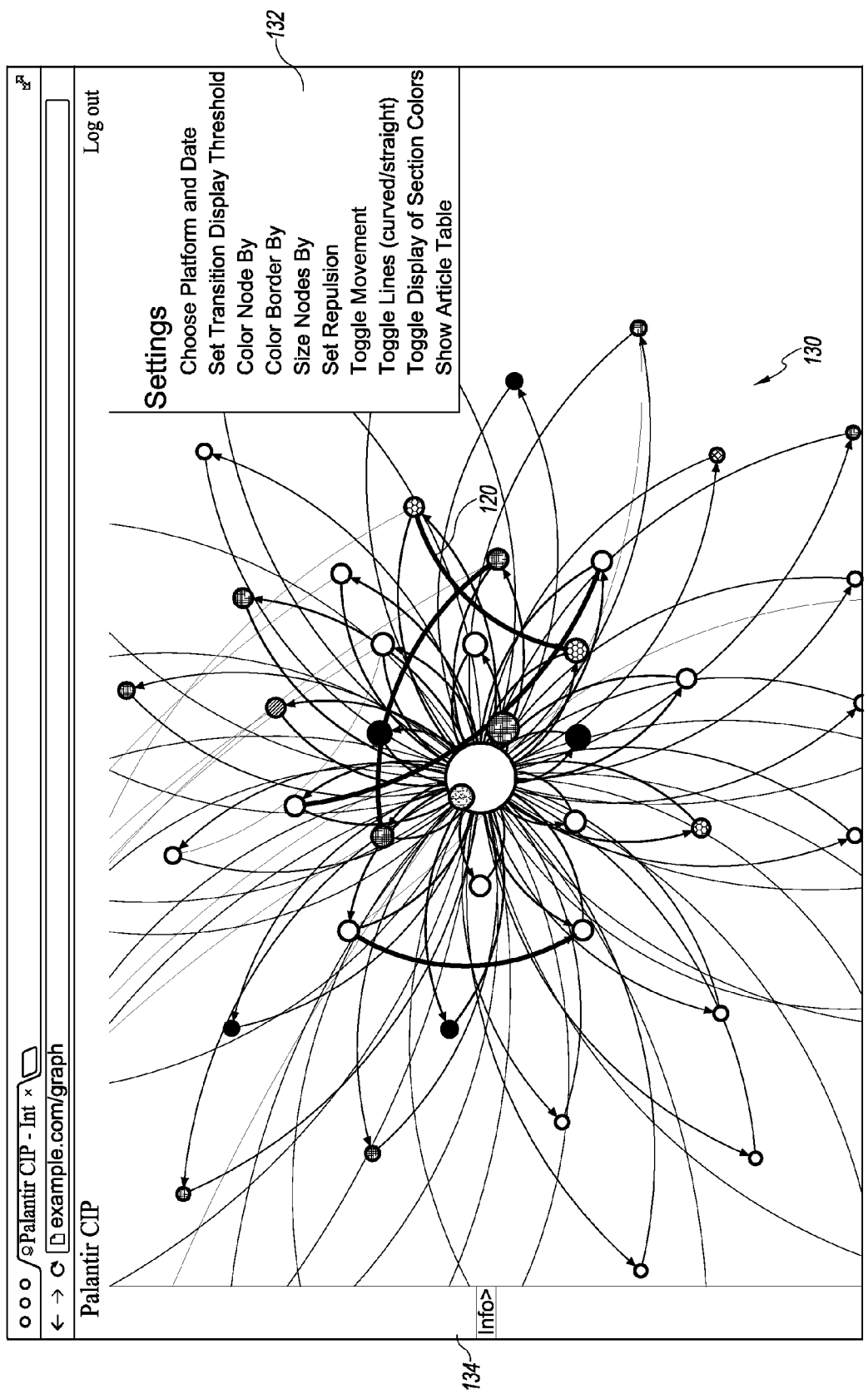
FIG. 1B illustrates another sample user interface of the user interaction data analysis system in which settings information is displayed, according to an embodiment of the present disclosure.

FIG. 1B illustrates another sample user interface of the user interaction data analysis system in which settings information is displayed, according to an embodiment of the present disclosure. The user interface of FIG. 1B includes an example graph 130, a settings pane 132, and a collapsed article information sidebar 134. As shown, each of the article information sidebar and the settings pane may be expanded and/or collapsed by the operator.

Figure 1C:
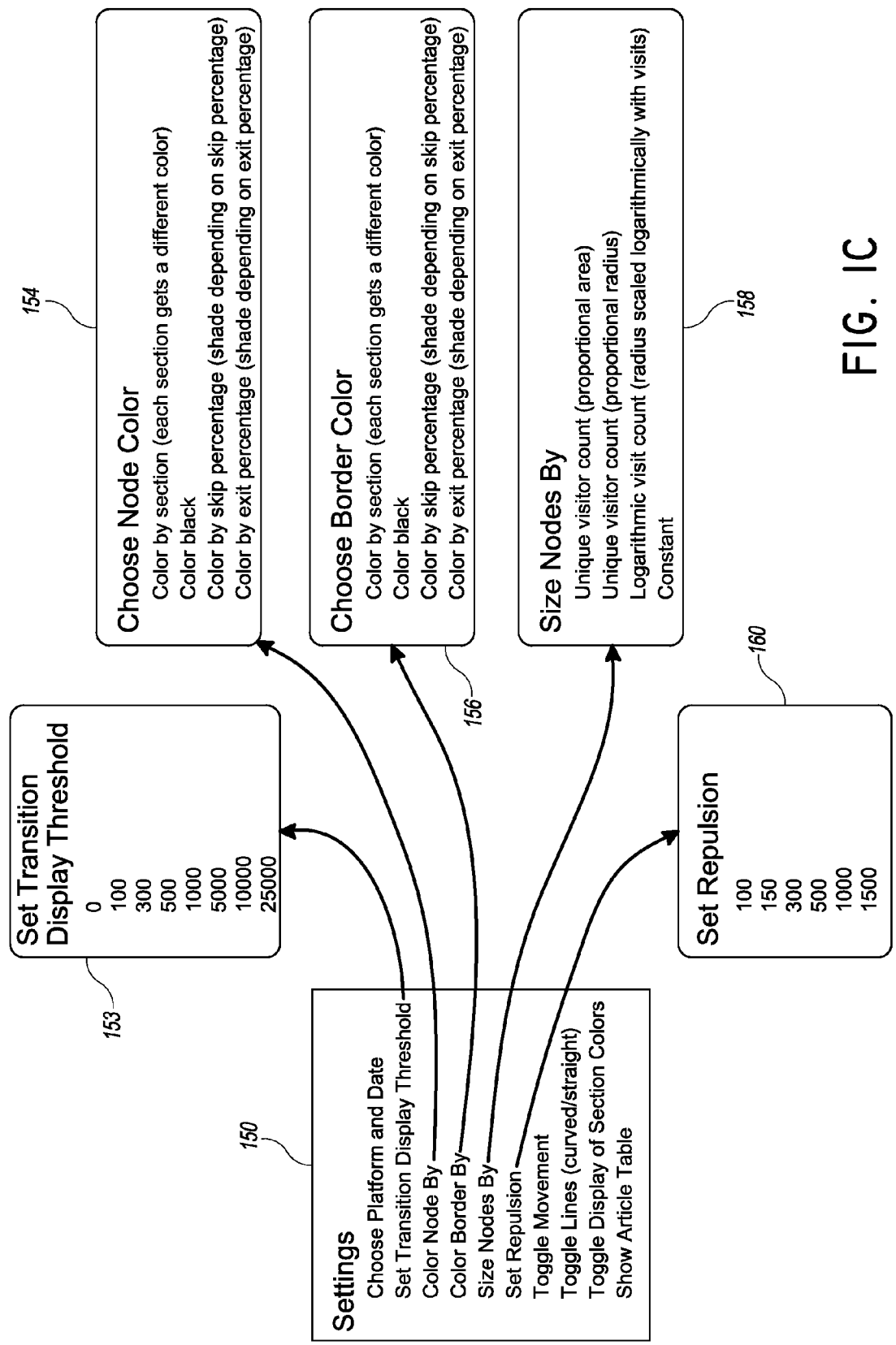
FIGS. 1C-1D illustrate sample settings options of the user interaction data analysis system, according to embodiments of the present disclosure.
Figure 1D:
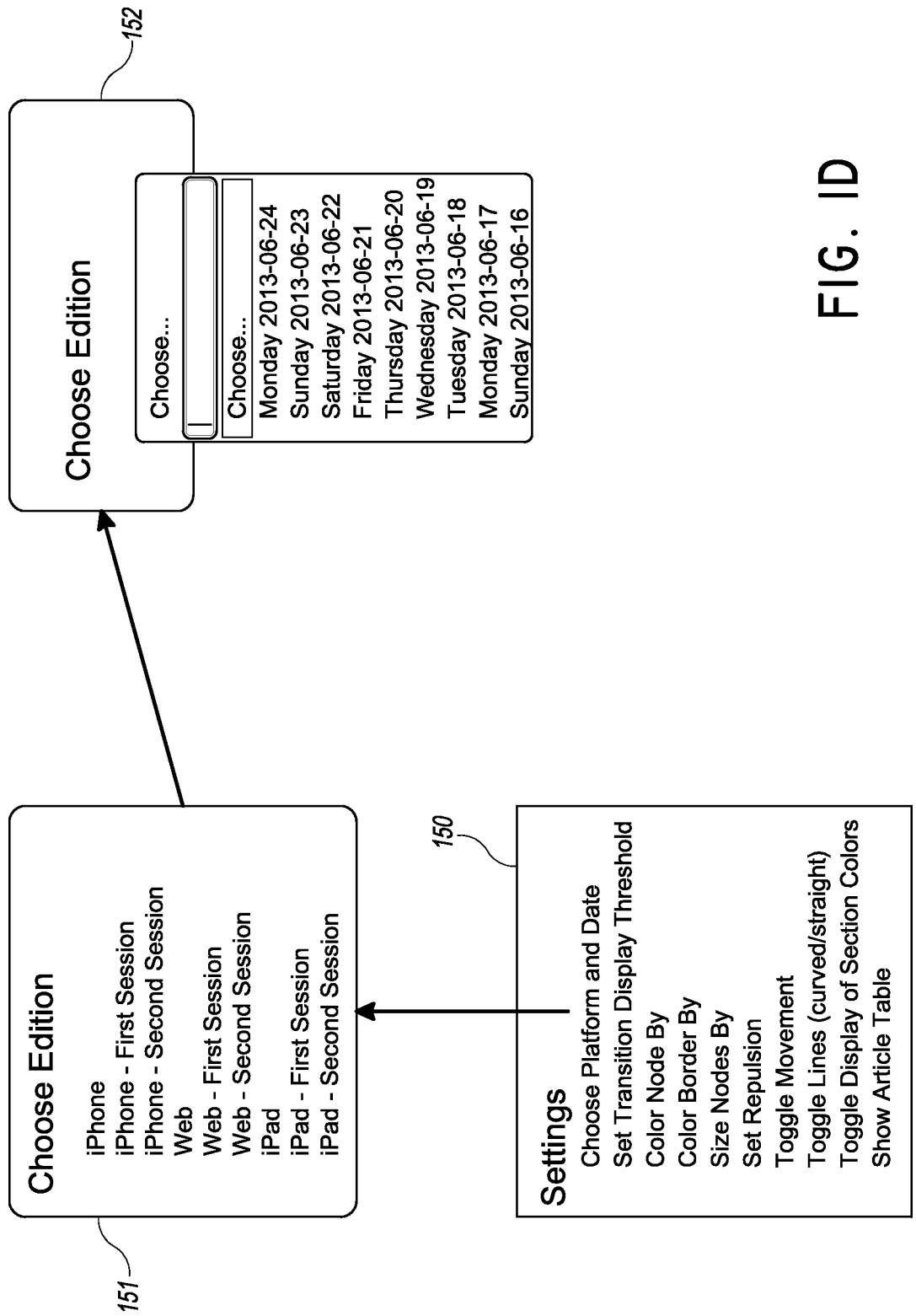

The settings pane 132 includes options and/or settings that may be used to alter the graph and/or display additional or different user interaction data. FIGS. 1C-1D illustrate sample settings options of the user interaction data analysis system, according to embodiments of the present disclosure.

The settings options shown in the settings pane 132 (of FIG. 1B) or 150 (of FIG. 10) include "Choose Platform and Date," "Set Transition Display Threshold," "Color Node By," "Color Border By," "Size Nodes By," "Set Repulsion," "Toggle Movement," "Toggle Lines (curved/straight)," "Toggle Display of Section Colors," and "Show Article Table." In various embodiments, more or fewer settings options may be displayed in the settings pane 132.

Turning to FIG. 1D, in an embodiment, when the "Choose Platform and Date" option is selected by the operator, a selection dialog is displayed on the user interface similar to selection dialog 151. As shown in selection dialog 151, the operator is given the option of choosing an edition (also referred to herein as a platform) from which user interaction data is to be displayed in the user interface. In the example of FIG. 1D, the operator may select from three different editions/platforms of app data including: smartphone app data (here, iPhone app data), web app data, and tablet app data (here, iPad app data). The various editions/platforms available for selection by the operator may each also include and/or be subdivided into, in various embodiments, one or more sessions. "Sessions" of app data may refer to collections of app data corresponding to particular user behaviors, for example, continuous user activity. For example, a "First Session" may refer to data collected that relates to a set of user's respective first sessions on a particular day, where a session may be defined by a period of continuous activity with no more than, for example, thirty minutes (or any other defined time period) between page views (or other activity, such as scrolling on the page or otherwise interacting with it). In the example of FIG. 1D, the operator may select, for each of the three listed editions/platforms, a complete set of app data (for example, "iPhone," "Web," and/or "iPad"), or a particular session of app data (for example, "iPhone—First Session," and/or "Web—First Session"). In another embodiment, selection dialog 151 may include a listing of various versions of each app/platform. For example, versions of an app may correspond to, for example, different software builds of the same general software application. For example, "iPhone" may correspond to a first version of a smartphone app for which user data was collected. After some updates, the smartphone app may be re-built and re-deployed to users (for example, "iPhone—Version 2"), and additional user data may be collected. The smartphone app may then be updated again (for example, "iPhone—Version 3"), re-built and re-deployed to users, and additional user data may be collected. In addition, or alternatively, the operator may use selection dialog 152 to select a particular set of user interaction data. For example, the operator may select from data collected on any particular day. Once the operator has selected a platform/edition, the selection dialog is removed from the user interface, the relevant user interaction data is retrieved, and a graph is generated and displayed based on the retrieved user interaction data (as described previously).

In an embodiment, the operator may select a platform/edition and then select a set of data from that platform gathered on a particular day. In an embodiment, more or fewer platforms may be included in selection dialogs 151 and 152. In an embodiment, only platforms having currently available data are displayed in selection dialogs 151 and 152.

Turning back to FIG. 10, in an embodiment, when the "Set Transition Display Threshold" option is selected by the operator, a selection dialog is displayed on the user interface similar to selection dialog 153. Selection dialog 153 allows the operator to select an edge/transition display threshold that determines what edges are displayed in the graph. For example, setting a threshold of 100 will cause any edges that represent fewer than 100 user transitions to not be displayed on the graph. In another example, setting a threshold of 5000 will cause any edges that represent fewer than 5000 transitions to not be displayed on the graph. Accordingly, in an embodiment, setting a higher threshold causes fewer edges to appear in the graph. Such a transition/edge display threshold may enable removal of less important edges from the graph so as to enable clearer viewing of nodes and edges in the graph. More or fewer threshold options may be displayed in the selection dialog 153. In an embodiment, and as described below, the operator may explicitly add and/or remove edges/transitions from the graph. In an embodiment, edges/transitions may be explicitly added and/or removed from the graph even when they are above or below the threshold. In an embodiment, the system may automatically select a default value for the transition display threshold. In other embodiments the threshold may be set in other manners using other user interface controls. For example, in one embodiment the user can adjust the threshold as the graph is displayed (e.g., graph 112 of FIG. 1A) such that the edges and nodes are dynamically added or removed as the user adjusts the threshold. In one embodiment, the user can adjust the threshold up and down using a scroll wheel on a mouse or other input device, arrows on the keyboard, or any other input device, to dynamically adjust the threshold in order to increase or decrease the quantity of nodes and edges displayed.

In an embodiment, when the "Color Node By" option is selected by the operator, a selection dialog is displayed on the user interface similar to selection dialog 154. Selection dialog 154 allows the operator to select a node fill-color scheme. Example listed options include "Color each section" (in which each node is colored according to the section that it belongs to), "Color black" (in which all the nodes are colored black), "Color by skip percentage" (in which the nodes are colored and/or shaded, for example in grayscale, based on the percent of users that visited the particular page/article associated with the node and then skipped, or exited, the page/article within a short period of time), and "Color by exit percentage" (in which the nodes are colored and/or shaded, for example in grayscale, based on the percent of users that visited the particular page/article associated with the node and then exited to a page or location not currently being tracked). In various embodiments, other node coloring schemes/options may be provided, including, for example, coloring or shading the nodes based on the mean user reading time and/or coloring the nodes based on the number of users who are male (or female in another embodiment) and remain on the associated article/page for some period of time. In an embodiment, any metrics used for node sizing (as described below) may be used for node coloring. In an embodiment, arbitrary functions may be defined for coloring and/or shading the nodes based on one or more user interaction metrics. For example, any metrics that return a discrete result (for example, a categorical scale such as sections) and/or a continuous numerical result (for example, a skip percentage) may be used in functions defining node coloring/shading. In an embodiment, more or fewer node coloring options may be displayed in the selection dialog 154. In an embodiment, the system may automatically select a default selection for the node color option.

In an embodiment, when the "Color Border By" option is selected by the operator, a selection dialog is displayed on the user interface similar to selection dialog 156. Selection dialog 156 allows the operator to select a node border-color scheme. Example listed options in FIG. 1C include the same options as those listed in the choose node color selection dialog 154. In general, and similar to the node fill color, the node border may be colored according to any metric-based criteria the operator defines. In an embodiment, more or fewer border coloring options may be displayed in the selection dialog 156. In an embodiment, the system may automatically select a default selection for the node border color option.

In an embodiment, the node fill-color scheme and the node border-color scheme may each be advantageously selected so as to provide rich visual information to the operator. For example, in an embodiment the node borders may be set to indicate the section with which the node is associated, while the node fill color may be selected to show greyscale shading indicating the node exit percentage. Such an arrangement may allow the operator to quickly identify the articles/pages and sections from which users are exiting the app.

In an embodiment, when the "Size Nodes By" option is selected by the operator, a selection dialog is displayed on the user interface similar to selection dialog 158. Selection dialog 158 allows the operator to select a node sizing scheme. Example listed options include "Unique visitor count (proportional area)" (in which the nodes are all sized relative to one another such that the area of each particular node is proportional to the number of unique visitors to the page associated with the particular node), "Unique visitor count (proportional radius)" (in which the nodes are all sized relative to one another such that the radius of each particular node is proportional to the number of unique visitors to the page associated with the particular node), "Logarithmic visit count (radius scaled logarithmically with visits)" (in which the nodes are all sized relative to one another such that the radius of each particular node is scaled logarithmically according to the number of unique visitors to the page associated with the particular node), and "Constant" (in which all the nodes are made the same size). In various embodiments, other node sizing schemes/options may be provided, including, for example, sizing nodes according to reading time, or some other user interaction metric. Other examples of node sizing metrics may include sizing based on exit proportion, skip proportion, a proportion of users deviating from a particular linear flow, and/or user demographic proportions (for example, a percent that are male, and/or a percent that have an age older than 50 years), among others. In an embodiment, any metrics used for node coloring (as described above) may be used for node sizing. In an embodiment, arbitrary functions may be defined for sizing nodes based on one or more user interaction metrics. In an embodiment, more or fewer node sizing options may be displayed in the selection dialog 158. In an embodiment, the system may automatically select a default selection for the node sizing option.

In an embodiment, when the "Set Repulsion" option is selected by the operator, a selection dialog is displayed on the user interface similar to selection dialog 160. Selection dialog 160 allows the operator to select a repulsion value that adjusts the force assigned to nodes and/or edges. Setting a repulsion value may, for example, proportionally adjust the force assigned to all nodes and/or edges, causing the graph to proportionally grow and/or shrink, or the nodes to move farther apart or closer together. Such a repulsion adjustment may enable clearer viewing of nodes and edges when many nodes and edges are present in the graph. In various embodiments, more or fewer repulsion options may be displayed in the selection dialog 160. In an embodiment, the system may automatically select a default selection for the repulsion option and/or may change the repulsion options automatically based on rules for optimizing display of the graph.

In an embodiment, when the "Toggle Movement" option of the settings pane 150 is selected by the operator, the displayed graph is toggled between two movement states. In a first movement state, the nodes and edges may automatically move and adjust according to the assigned forces and in response to manipulations by the operator (as described above in the description of the force-directed graph). In a second movement state, the nodes and edges are "frozen" in place such that they do not automatically move, but may still be moved and manipulated by the operator. In an embodiment, the second movement state may be selected by the operator such that the graph may more easily be manipulated and investigated. In an embodiment, the system may automatically select a movement state as a default selection for the toggle movement option.

In an embodiment, when the "Toggle Lines (curved/straight)" option of the settings pane 150 is selected by the operator, the displayed graph is toggled between two line states. In a first line state, the edges between the nodes are curved, as shown in FIGS. 1A and 1B. In the first line state, the directionality of the edges may be apparent from the arrows, and two separate edges connecting the same two nodes (for example, one directed from a first node to a second node, and one directed from the second node to the first node) may be visible. In a second line state, the edges between the nodes are straight. In the second line state, the directionality of the edges may or may not be displayed and/or apparent. For example, in an embodiment, in the second line state arrows may not be displayed. In an embodiment, in the second line state the width or thickness of the edges may be made constant, such that it may not vary based on the number of user transitions. In an embodiment, in the second line state two edges connecting the same two nodes may overlap one-another such that they may not be distinguishable. In an embodiment, the second line state may be selected by the operator such that the graph may more clearly and more easily be investigated. In an embodiment, the second line state may require less processor power to render, and thus may be advantageous on computer systems with limited processing resources. In an embodiment, the system may automatically select a line state as a default selection for the toggle lines option. In an embodiment, some edges displayed on the graph may be straight while some may be curved. For example, in an embodiment, when two node are sufficiently close to one another (based on some predetermined criteria), any edge between the two nodes automatically becomes straight. This embodiment may be desired as, when two nodes are close to one another, a straight edge may be indistinguishable from a curved line.

In an embodiment, when the "Toggle Display of Section Colors" option of the settings pane 150 is selected by the operator, the displayed key 110 (as shown in FIG. 1A) is toggled between a visible state and an invisible state. In an embodiment, displaying the key 110 may be useful when a screenshot of the user interface is taken and later referenced, as colors associated with the different sections may then be determinable in the screenshot. In an embodiment, the system may automatically select a visibility state as a default selection for the toggle display of section colors option.

In an embodiment, when the "Show Articles Table" option of the settings pane 150 is selected by the operator, an article table is displayed to the operator. The article table is described in detail in reference to FIG. 5 below.

In an embodiment, the transition/edge display threshold may be variable. For example, the threshold may vary based on a distance from a particular node, for example a homepage. In another embodiment, the threshold may vary based on the repulsion value. Alternatively, the repulsion value may vary based on the transition threshold, the number of transitions associated with a particular edge, and/or some other metric associated with a node and/or edge.

Turning back to FIG. 1B, graph 130 includes user interaction data similar to that shown in graph 112 of FIG. 1A, with the exceptions that the display is zoomed in on the graph, and additional edges/transition lines are shown. In the embodiment of FIG. 1B, the operator has selected the "Set Transition Display Threshold" option from the settings pane 132, and adjusted the display threshold to a lower value such that additional edges may be visible in the graph 130 (for example, edge 120). For example, the operator may have changed the threshold from 1000 to 500. The newly added edges have been darkened in FIG. 1B for illustrative purposes and so that they may be distinguished. However, typically the newly added edges would be narrower than the previously displayed edges as the newly added edges represent fewer user transitions than the previously displayed edges.

In an embodiment, and as described above, the graph may be manipulated by the operator. For example, the operator may move individual nodes and/or groups of nodes. In an embodiment, the graph may re-adjust automatically when a node or edge has been manipulated and/or moved, for example, when the graph is not "frozen". In an example, nodes may be selectively added or removed by the operator. In another example, nodes may be automatically added to the graph based on some criteria in an animated fashion, as is described below in reference to FIGS. 4A-4F. In various embodiments, the graph may be manipulated by the operator in other ways not explicitly listed above.

In an embodiment, the operator may select particular user interaction data of interest to be displayed in the graph. For example, the operator may choose to view user interaction data from a particular morning, evening, and/or other time of day. Alternatively, the operator may choose to view user interaction data associated with users having a particular characteristic, for example, users that are male or female. In an embodiment, the operator may choose to view user interaction data based on any combination of metrics and/or timeframes.

Sample User Interface—Example Tablet and Smartphone App Graphs

Figure 2A:
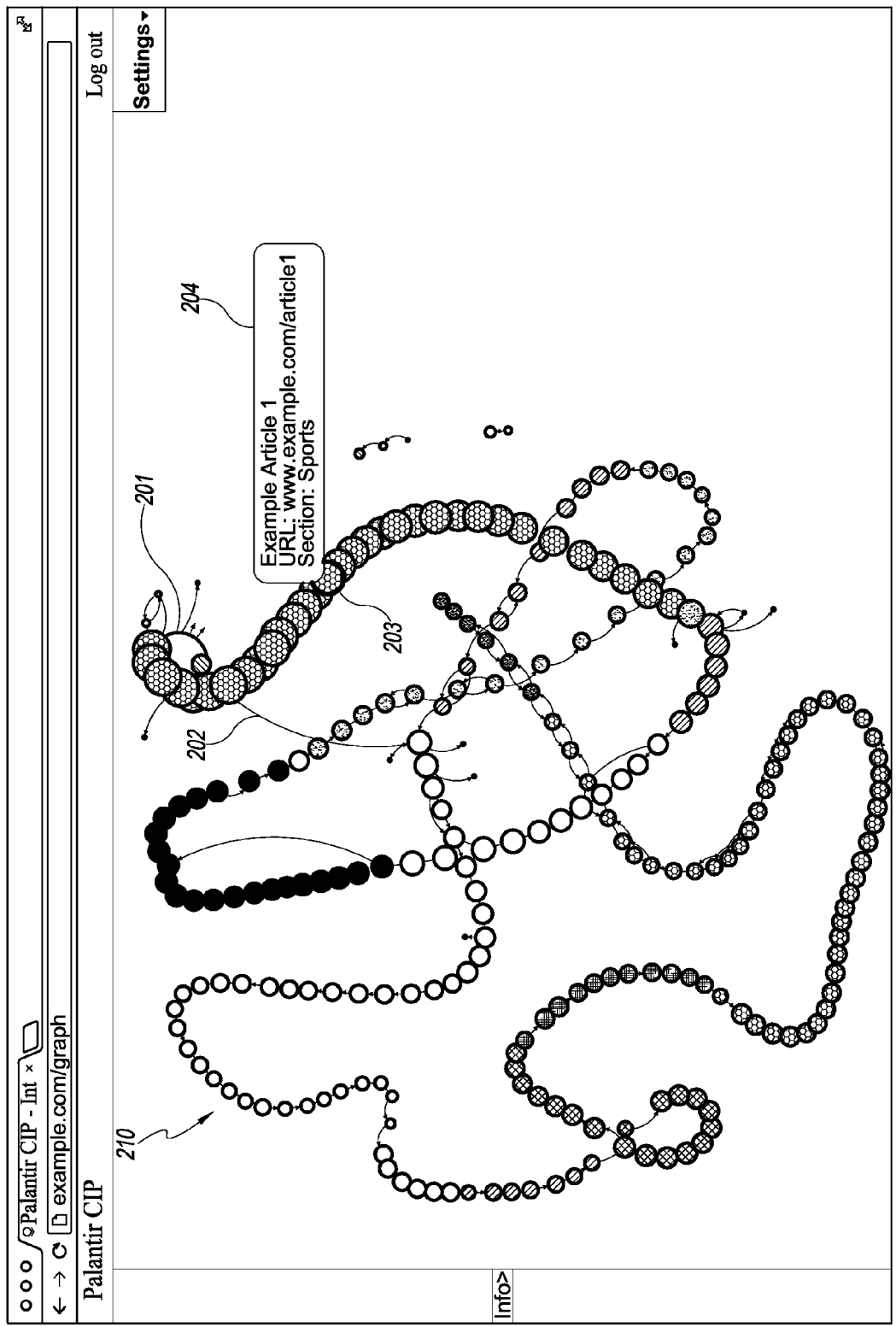
FIGS. 2A-2D illustrate additional sample user interfaces of the user interaction data analysis system, according to embodiments of the present disclosure.
Figure 2B:
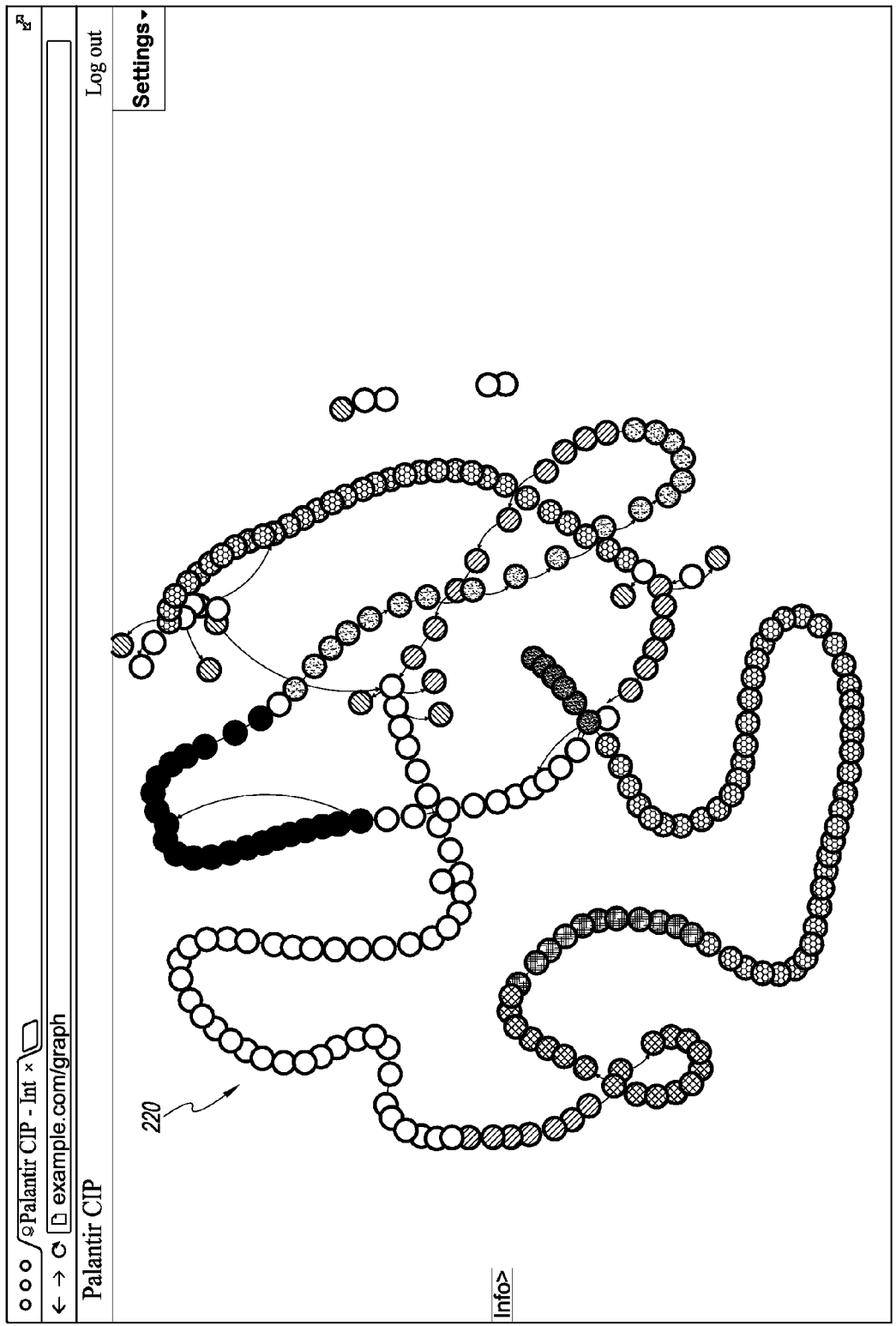
Figure 2C:
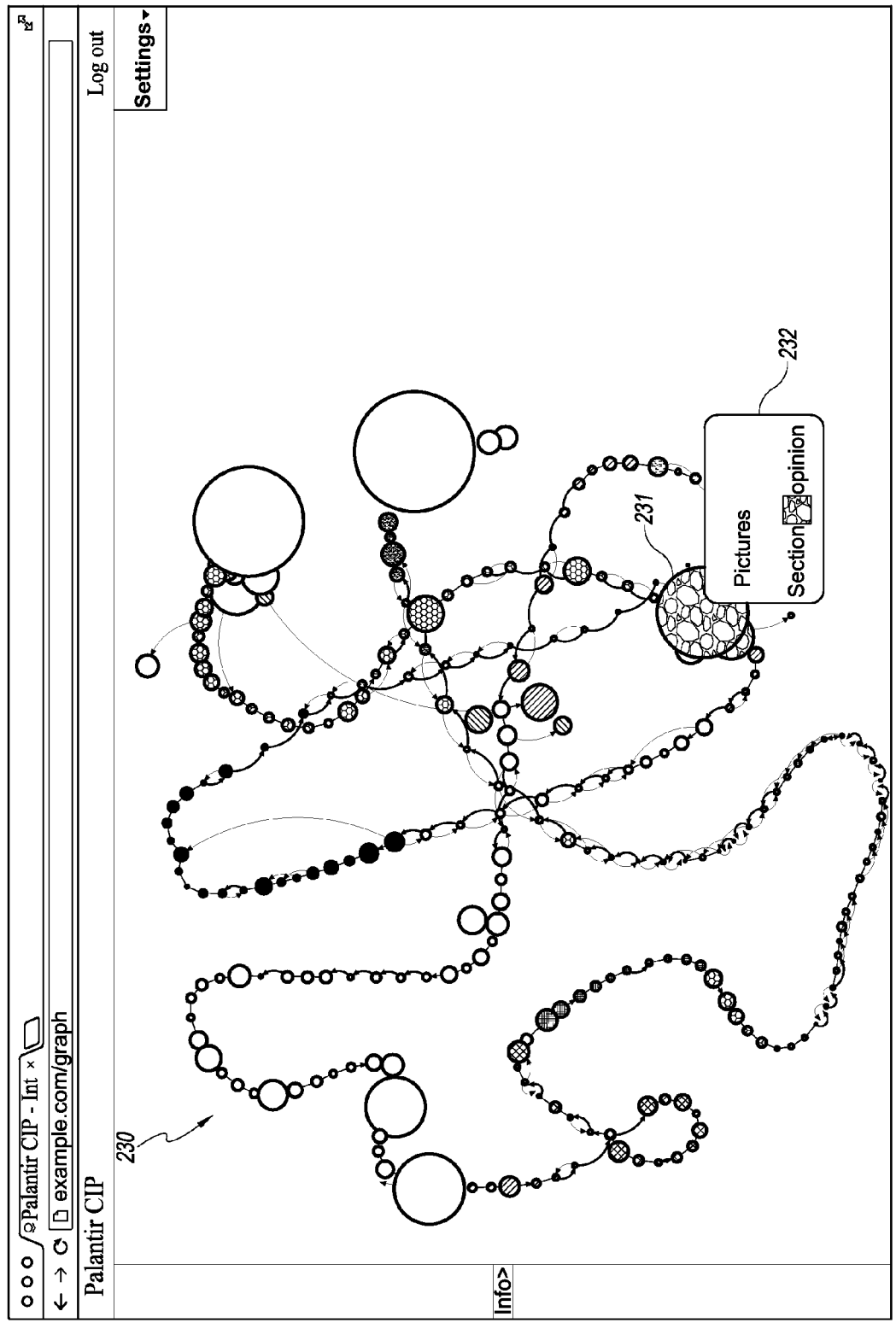
Figure 2D:
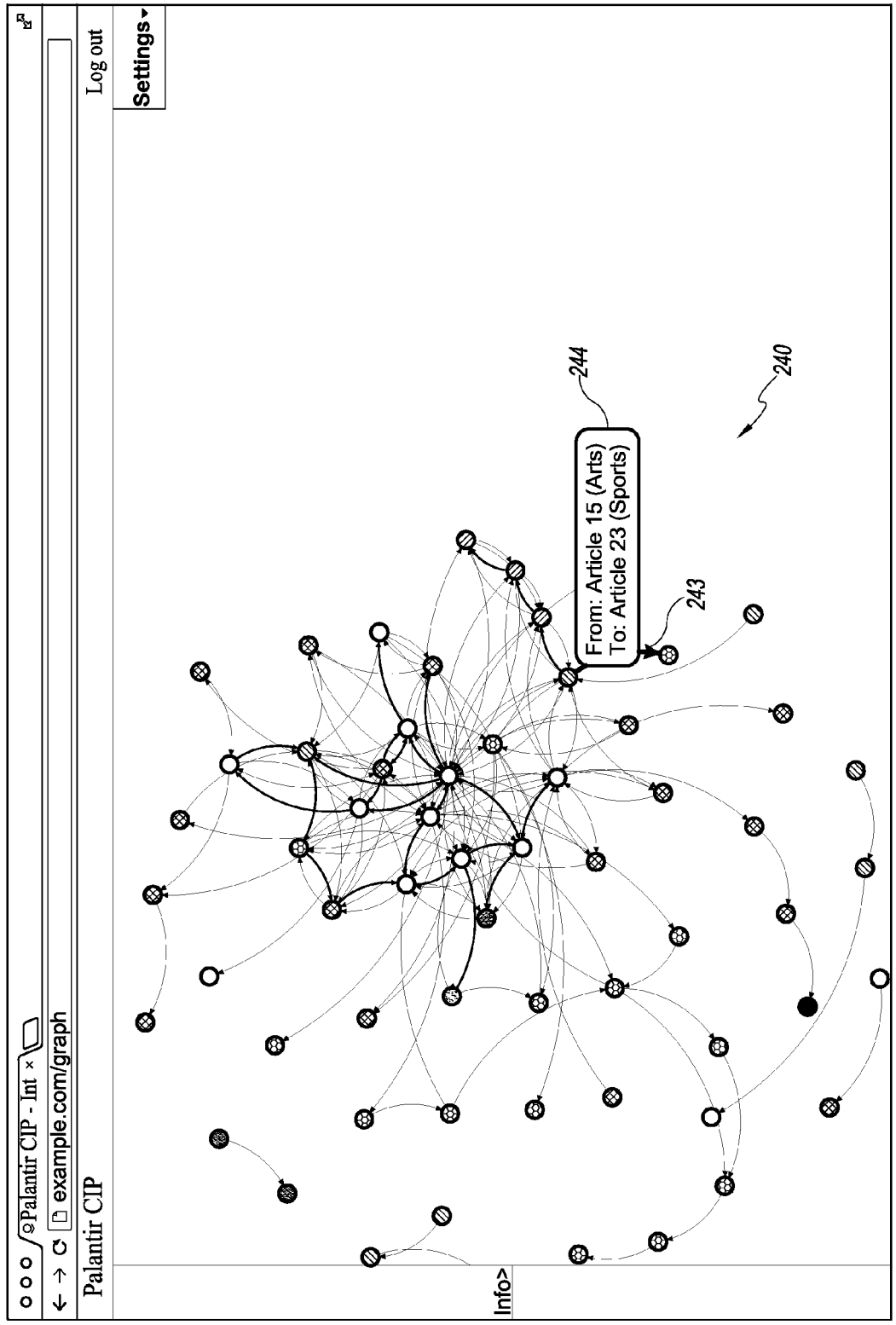

FIGS. 2A-2D illustrate additional sample user interfaces of the user interaction data analysis system, according to embodiments of the present disclosure. The example user interfaces of FIGS. 2A-2C are generated based on similar graph generation rules, characteristics, and/or settings as were described above with reference to FIGS. 1A-1B. However, rather than being based on web app user interaction data (as was the case in FIGS. 1A-1B), FIGS. 2A-2C illustrate user interfaces in which tablet app user interaction data is visualized, while FIG. 2D illustrates a user interface in which smartphone app user interaction data is visualized. As in FIGS. 1A-1B, the user interfaces of FIGS. 2A-2D may be displayed in a browser window, may include a graph display area, and may be implemented in one or more computer modules and/or processors, as is described below with reference to FIGS. 8A-8B. Further, in the user interfaces of FIGS. 2A-2D, the sidebar and settings pane are both collapsed.

FIGS. 2A-2C display force-directed graphs that are based on tablet app user interaction data. The tablet app from which the FIG. 2A-2C data is derived provides the same or similar example news content as is used in the web app of FIG. 1A. In contrast with graph 112 of FIG. 1A, the graphs of FIGS. 2A-2C show a linear user behavior in which users generally transition from one article to the next.

Specifically with reference to FIG. 2A, graph 210 includes various nodes and edges as described in reference to FIG. 1A. The nodes and/or edges may be manipulated, sized, colored, and/or adjusted as described above in reference to FIGS. 1A-1D. In the example of FIG. 2A, the node fill colors are based on sections. Additionally, the nodes are sized based on number of unique visitors. As may be observed, users generally transition from homepage node 201 and move linearly through various sports articles, and then through various other articles. It may also be observed that generally each subsequent article has fewer unique visitors as visitors leave the tablet app and/or transition to other articles. Other user transitions may be seen, for example the user transition along edge 202 from an article in the sports section to an article in another section. Additionally, the operator is hovering a cursor over and/or has selected node 203, resulting in the pop over 204 displaying various items of information associated with node 203. For example, it may be seen that node 203 is associated with an article named "Example Article 1," and which is available at the URL "www.example.com/article1." Further, Example Article 1 is found in the sports section.

With reference to FIG. 2B, the same user interaction data is displayed as is displayed in FIG. 2A. However, the operator has chosen to size the nodes constantly. Thus, all the nodes in graph 220 of FIG. 2B are the same size.

With reference to FIG. 2C, the same user interaction data is displayed as is displayed in FIGS. 2A-2B. However, the operator has chosen to size the nodes logarithmically based on visit count. Thus, certain nodes in graph 230 of FIG. 2C have significantly different relative sizes. Additionally, FIG. 2C shows that the operator is hovering a cursor over and/or has selected node 231, resulting in the pop over 232 displaying various items of information associated with node 231. For example, it may be seen that node 231 is associated with an article named "Pictures," and is found in the opinion section. In this example, the pop over 232 has different characteristics than the pop over 204 (of FIG. 2A). In various embodiments, pop overs of the system may include different and/or varying characteristics, and/or may be displayed in different formats.

FIG. 2D displays a force-directed graph that is based on smartphone app user interaction data. The smartphone app from which the FIG. 2D data is derived provides the same or similar example news content as is used in the web app of FIG. 1A. In contrast with graph 112 of FIG. 1A, graph 240 of FIG. 2D shows a semi-linear user behavior in which users sometimes transition from one article to the next, but in which users also frequently jump from one article to another in a non-linear way. Such behavior may be referred to as "navigation loops." In the example of FIG. 2D, the nodes of graph 240 are sized constantly. Additionally, in FIG. 2D the operator is hovering a cursor over and/or has selected edge 243, resulting in the pop over 244 displaying various items of information associated with edge 243. For example, it may be seen that edge 243 originates at Article 15 (which is in the section Arts) and ends at Article 23 (which is in Sports).

In various embodiments, the system may enable an operator to compare and contrast user behaviors and/or patterns among the various platforms. For example, the system enables an operator to clearly see that users of the tablet app move linearly from one article to the next, users of the web app jump from homepage to article to homepage, and users of the smartphone app move in semi-linear paths. Additionally, the operator may determine, for example, that the web app generally has a higher exit percentage than the tablet app. The operator may conclude, for example, that the tablet app is more appropriate for longform reading, while the web app and/or the smartphone app is more appropriate for shorter articles and user visits.

Sample User Interface—Example Sections Graph

Figure 3A:
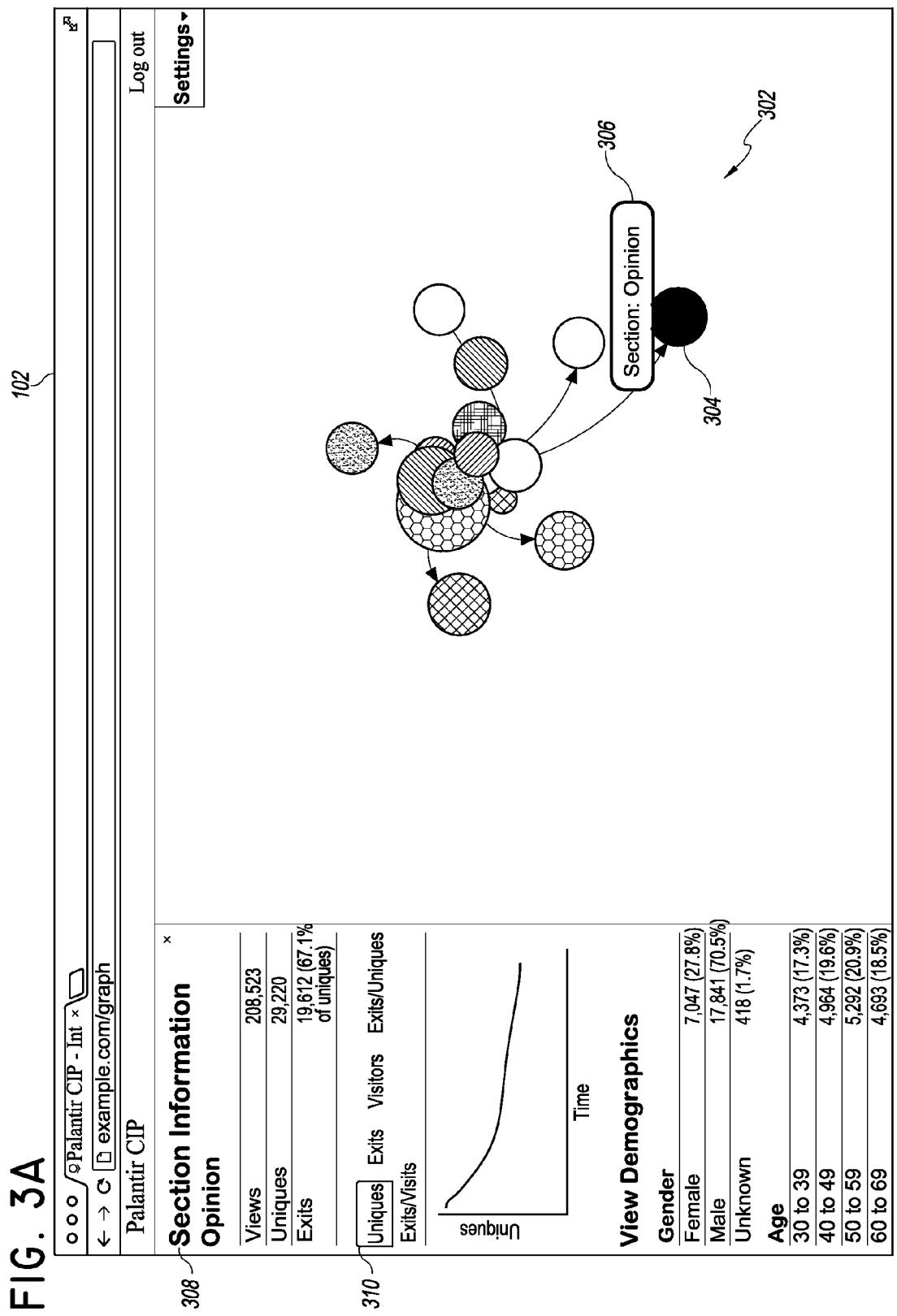
FIG. 3A illustrates a sample user interface of the user interaction data analysis system in which a sections graph is displayed, according to an embodiment of the present disclosure.

FIG. 3A illustrates a sample user interface of the user interaction data analysis system in which a sections graph is displayed, according to an embodiment of the present disclosure. As in figures described above, the user interface of FIG. 3A may be displayed in a browser window, may include a graph display area, and may be implemented in one or more computer modules and/or processors, as is described below with reference to FIGS. 8A-8B. Further, the user interface of FIG. 3A includes a sidebar with section information 308 and a force-directed graph 302.

The graph 302 of FIG. 3A shows user interaction data aggregated into sections. For example, each node of the graph 302 represents a particular section, while the edges each represent aggregated user transitions from any article in a given section, to any other article in another section. In an embodiment, the sections graph 302 is useful to enable the operator to determine user behavior at a higher level (for example, sections rather than articles).

FIG. 3A shows that the operator is hovering a cursor over and/or has selected node 304, resulting in the pop over 306 displaying various items of information associated with node 304. For example, it may be seen that node 304 is associated with the opinion section. Additionally, various data and information associated with the selected node 304 is displayed in the sidebar. Section information 308 indicates, for example, that the section is the opinion section, and various metrics associated with the section (similar to that described above in reference to FIG. 1A). Indicator 310 indicates that "uniques" is selected, causing the system to display a graph showing the change in number of unique visitors to the opinion section over time. Such a sidebar graph may be useful, for example, to enable the operator to determine how the number of unique visitors/users decays as the users transition through a particular section. For example, the operator may determine that users exit from a particular section very quickly. In an embodiment, the sidebar graph may be made specific to a particular demographic. For example, the operator may examine the behavior of males over time within a particular section.

FIGS. 3B-3F illustrate various other sample section information sidebars of the user interaction data analysis system, according to embodiments of the present disclosure. Any of the example section sidebars of FIGS. 3B-3F may be displayed on the user interface of FIG. 3A.

Figure 3B:
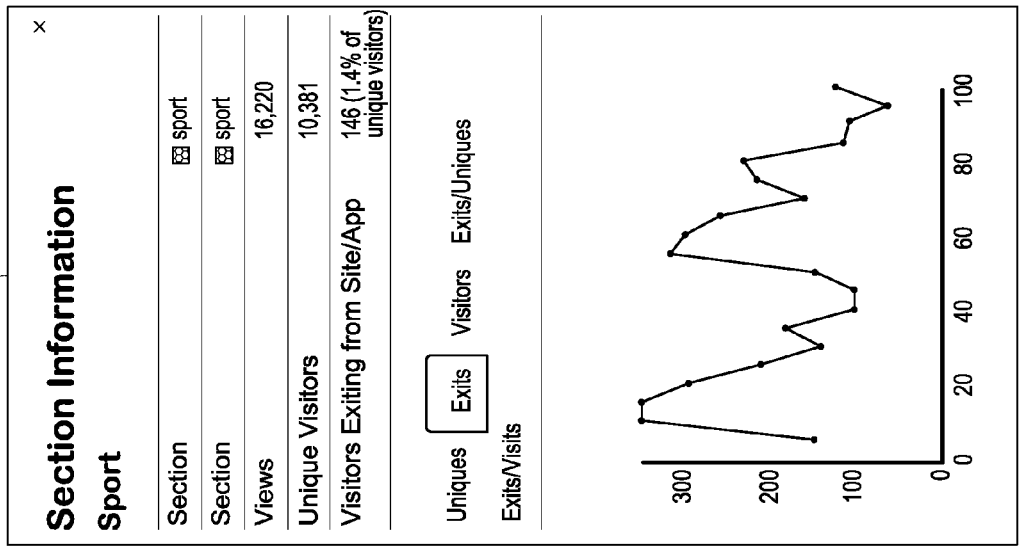
FIGS. 3B-3F illustrate sample section information sidebars of the user interaction data analysis system, according to embodiments of the present disclosure.
Figure 3C:
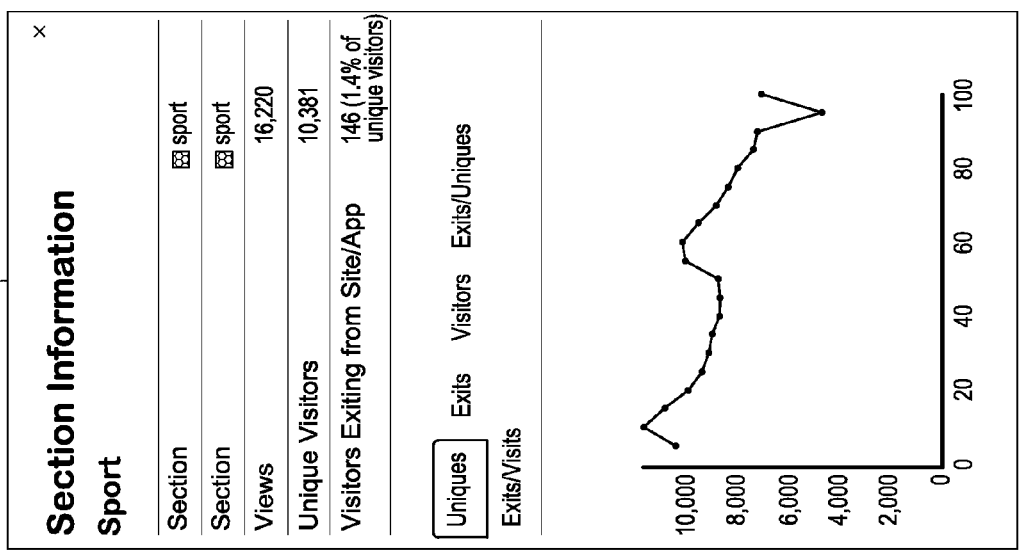
Figure 3D:
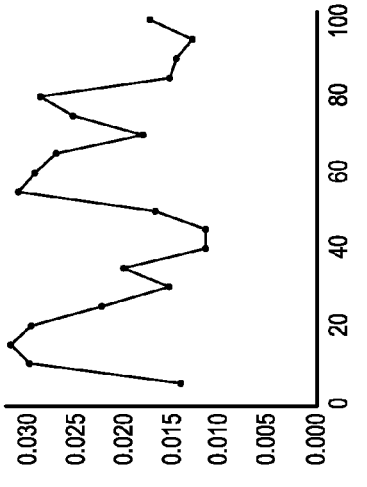
Figure 3E:
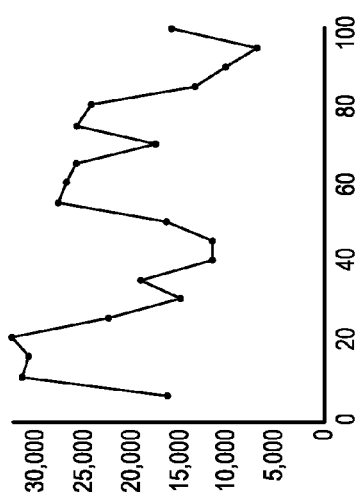
Figure 3F:
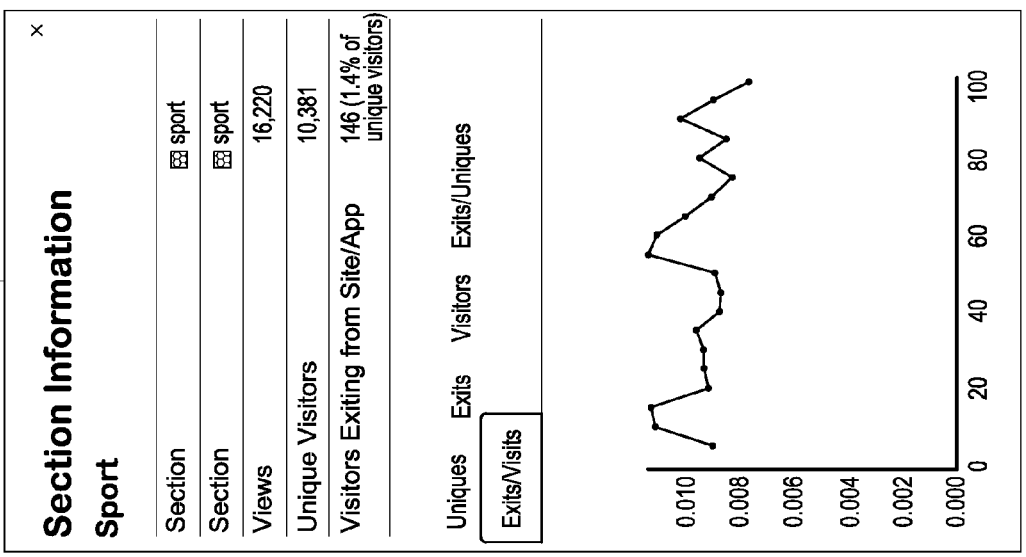

Sidebar 320 of FIG. 3B shows a graph indicating a change in a number of unique users/visitors to a sports section over time. Sidebar 322 of FIG. 3C shows a graph indicating the change in a number of user exits from the sports section over time. Sidebar 324 of FIG. 3D shows a graph indicating the change in a number of visitors or visits from users to the sports section over time. Sidebar 326 of FIG. 3E shows a graph indicating the change in a fraction of exits divided by number of unique visitors for the sports section over time. Sidebar 328 of FIG. 3F shows a graph indicating the change in a fraction of exits divided by number of user visits for the sports section over time. In various embodiments, other user data/metrics may be displayed in a graph format in the sidebar. In an embodiment, graphical user interaction data may be presented on the sidebar of, for example, FIG. 1A.

Sample Operator Manipulations and Graph Animation

FIGS. 4A-4F illustrate additional sample user interfaces of the user interaction data analysis system in which graph nodes are added, removed, and/or animated, according to embodiments of the present disclosure. As in the figures above, the user interfaces of FIGS. 4A-4F may be displayed in a browser window 102, and may include a graph display area, a sidebar, and/or a settings panel. As with the embodiments above, the embodiments of FIGS. 4A-4F may be implemented in one or more computer modules and/or processors, as is described below with reference to FIGS. 8A-8B.

Figure 4A:
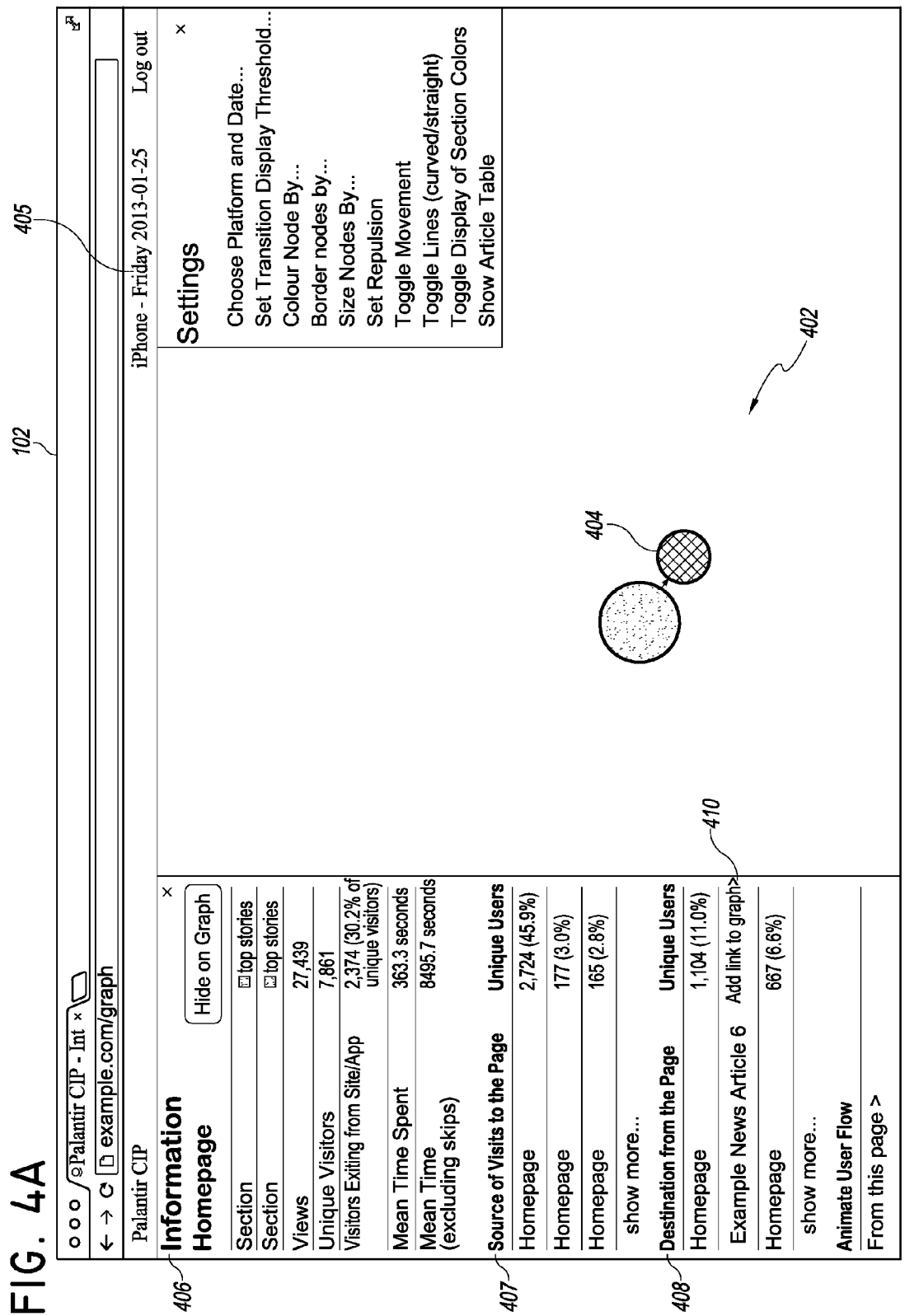
FIGS. 4A-4F illustrate sample user interfaces of the user interaction data analysis system in which graph nodes are added or removed, according to embodiments of the present disclosure.

As indicated by indicator 405, the user interaction data displayed in the graph of FIG. 4A is from an iPhone (for example, a smartphone app) and collected on Friday, 2013-01-25. A displayed graph 402 currently includes two nodes, including selected node 404. The currently displayed nodes may have been added to the graph 402 automatically by the system based on a selection of the operator, and/or manually by the operator. For example, the operator may have selected the particular articles/pages that they wanted to view on the graph. Information associated with the selected node 404 is displayed in the sidebar 406. For example, currently selected node 404 is titled "Homepage," has various associated sources from which users arrive at the article/page (as indicated by 407), and has various associated destinations to which users go when leaving the article/page (as indicated by 408).

In an embodiment, the operator may select "Add link to graph" 410, at which point a node associated with the particular listed destination article may be added to the graph 402. In an embodiment, when the user hovers a cursor over, and/or otherwise selects a source and/or destination from the sidebar, an "Add link to graph" button or link is automatically displayed. The result of selecting "Add link to graph" 410 is shown in FIG. 4B.

Figure 4B:
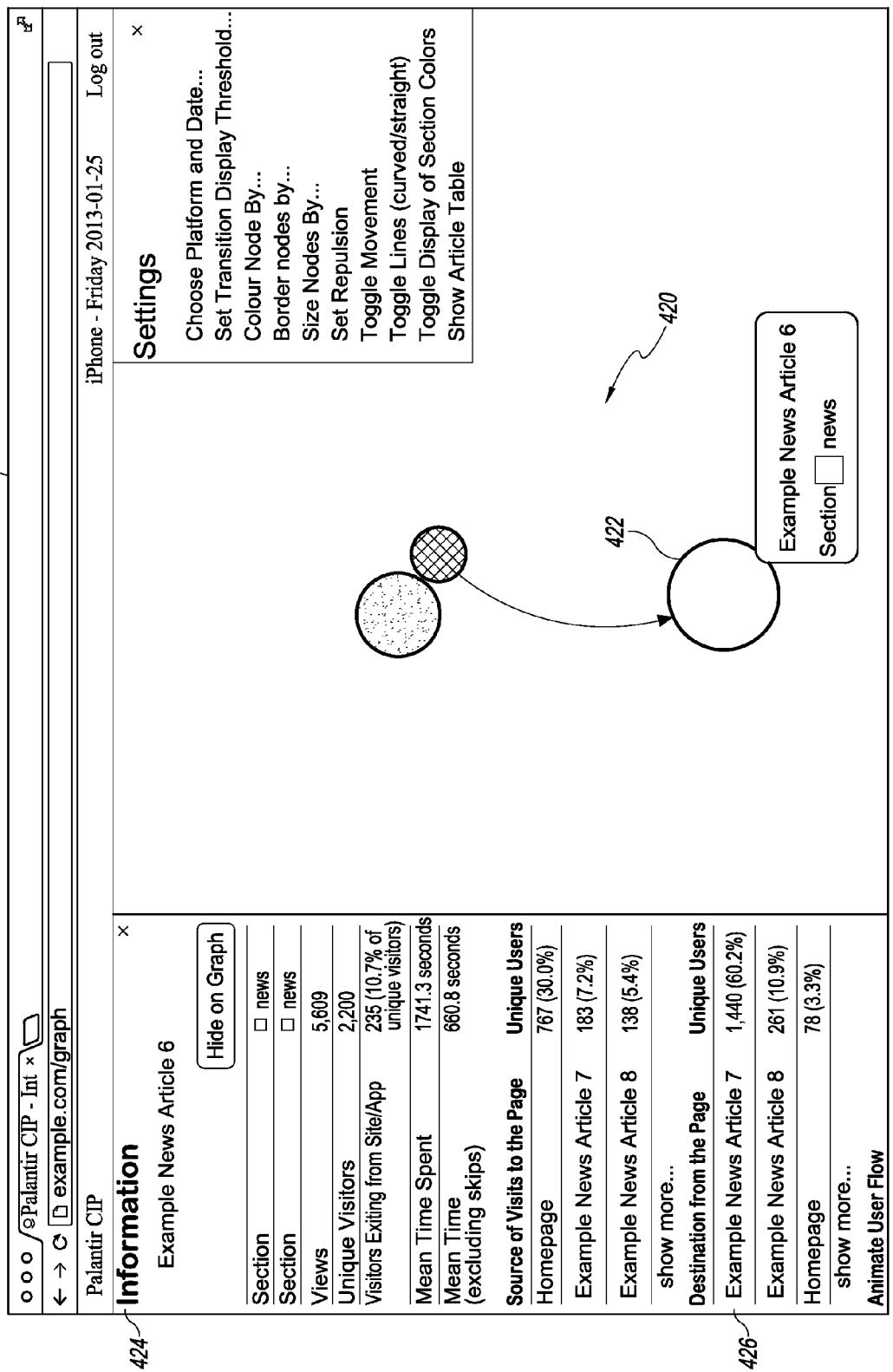

As shown in FIG. 4B, a new node 422 has been added, resulting in the displayed graph 420. Node 422 may be selected by the operator, resulting the in the display of a pop over and associated article information in the sidebar 424. Included in the sidebar 424 is destination article 426 "Example News Article 7." The operator may again select to add a node to the graph 420 by selecting an "Add link to graph" link associated with the destination article 426. The result of adding a node to the graph associated with destination article 426 is shown in FIG. 4C.

Figure 4C:
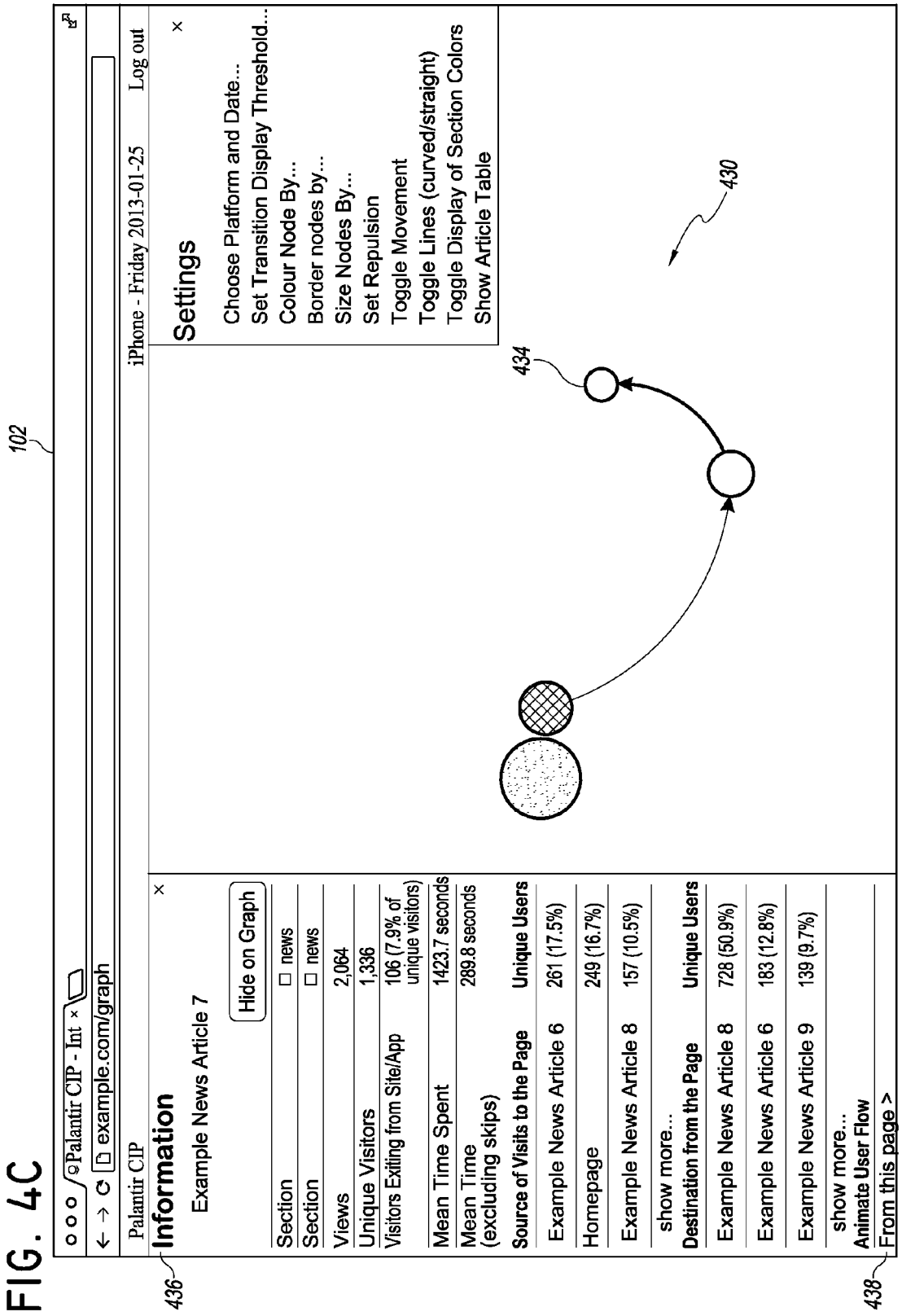

As shown in FIG. 4C, a new node 434 has been added, resulting in the displayed graph 430. Node 443 may be selected by the operator, resulting in display of associated article information in the sidebar 436. Included in the sidebar 436 is link 438 "Animate User Flow From this page>." In an embodiment, selecting link 438 will cause the system to automatically begin adding successive destinations to the graph in an animated fashion. For example, in an embodiment, the most common (by unique user transitions) destination of the currently selected node may be added to the graph. Then, the most common destination associated with the newly added node may be automatically added to the graph. This process may continue automatically until, for example, a node is added which has no further destinations (or no further destinations that have a number of transitions above the currently set threshold). For example, when the transition display threshold is set to a value of 100, when a node is added with no destinations having more than 100 transitions, the animation may stop. In another embodiment, the animation process may continue automatically until, for example, a node is encountered that already exists on the graph. In an embodiment, the animation may proceed at a pace slow enough such that the operator may observe each node as it is being added to the graph. In an embodiment, the animation may provide the operator insights into common user interaction patterns with the displayed content and platform.

Figure 4D:
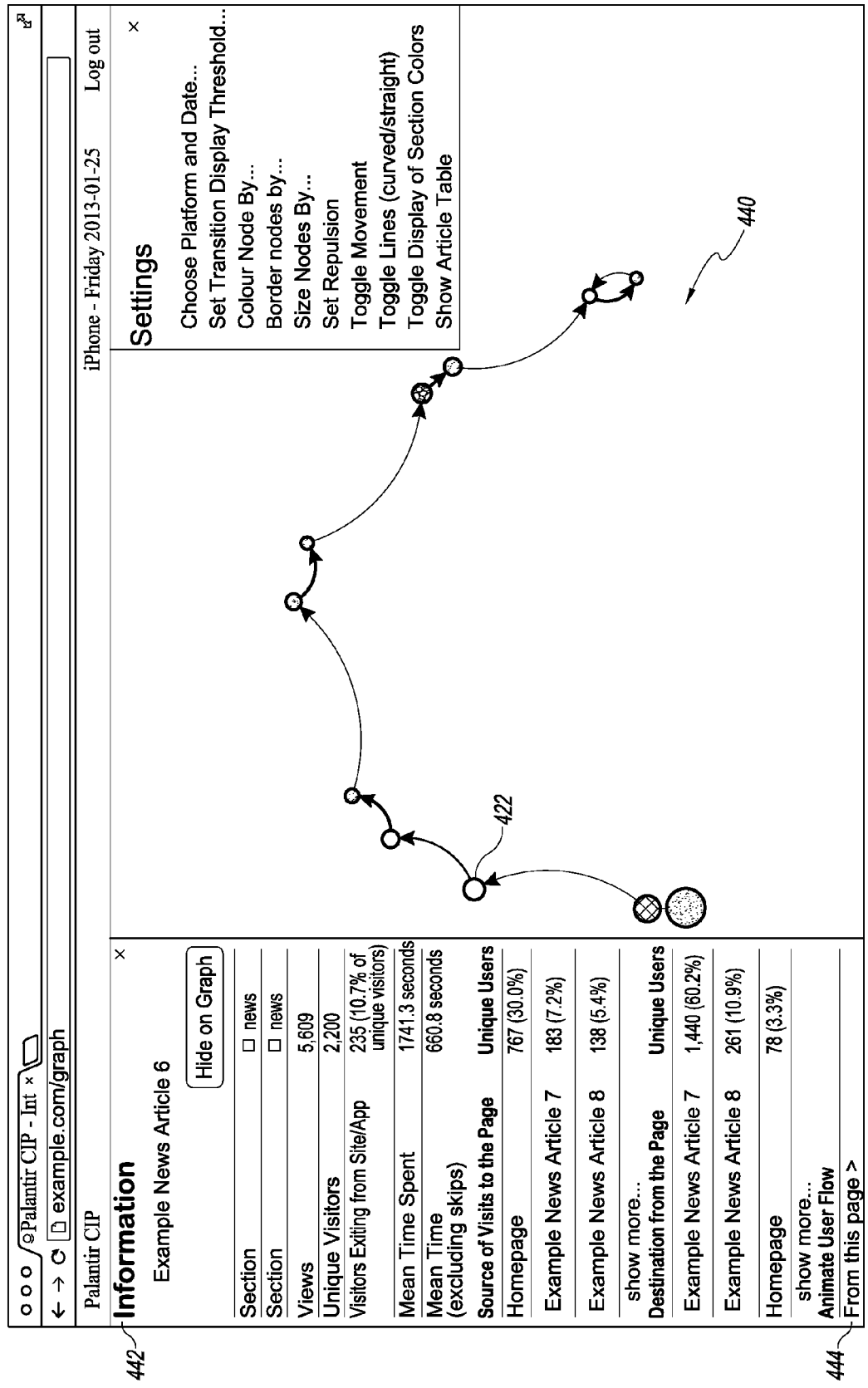

In an embodiment, selecting link 438 may result in a graph 440 shown in FIG. 4D. As shown in graph 440, various nodes and associated edges have been automatically added to the graph. As further shown, the operator has again selected node 422, and information associated with that node is displayed in sidebar 442. At this point, the operator may again select an "Animate User Flow From this page>" link 444. In an embodiment, the selecting the animation link 444 will cause the system to automatically begin adding successive destinations to the graph in an animated fashion. In an embodiment, the automatically added destinations may be designated to be, for example, the most common destinations that are not already displayed in the graph. Accordingly, selecting the animation link associated with node 422 a second time may cause different nodes to be added to the graph than were previously added, as shown in FIG. 4E.

Figure 4E:
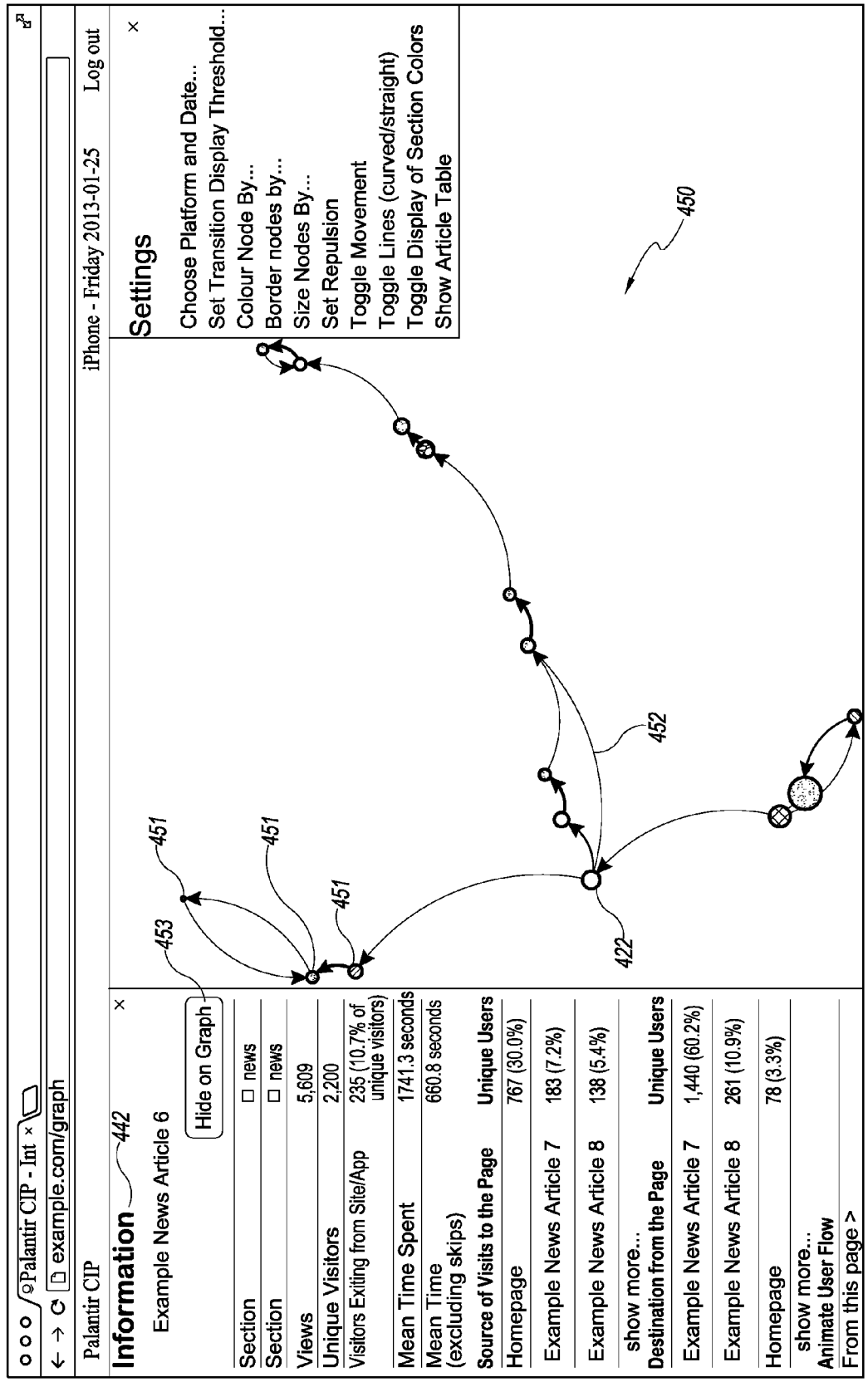
Figure 4F:
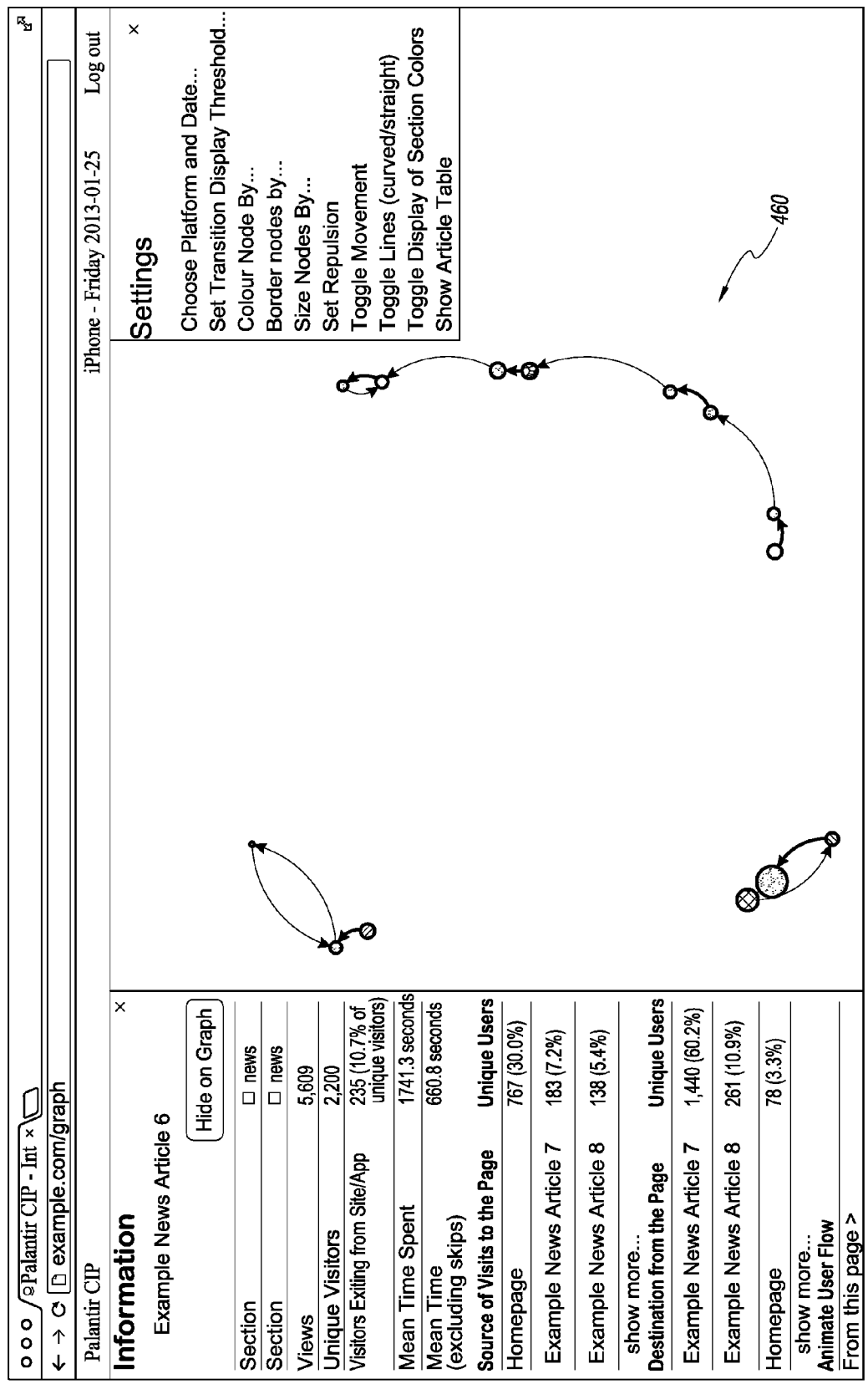

As shown in graph 450 of FIG. 4E, additional destination nodes 451 have been added. Additionally, in an embodiment, other common transitions/edges between already displayed nodes may be added when the animation link is selected. This may be seen, for example, in the addition of edge 452 to graph 450. In FIG. 4E, node 422 is again selected by the operator, and the sidebar 442 includes various information associated with the node. In an embodiment, the operator may select button 453, "Hide on Graph," to remove the currently selected node (and/or nodes) from the graph. Selecting button 453 may result in, for example, a graph 460 as shown in FIG. 4F. In the graph 460, node 422 has been removed, and each of the remaining nodes has moved and/or readjusted based on the forces associated with the nodes and edges.

In an embodiment, the operator may choose to view all exits and/or destinations from a particular article/node. In this embodiment, the operator may, for example, manually add a particular node to the graph, and select to views all exits and/or destinations from that node. Such a selection may result in, for example, the automatic addition of edges and nodes to the graph representing all transitions from the particular node, and all destinations.

Article Table

Figure 5:
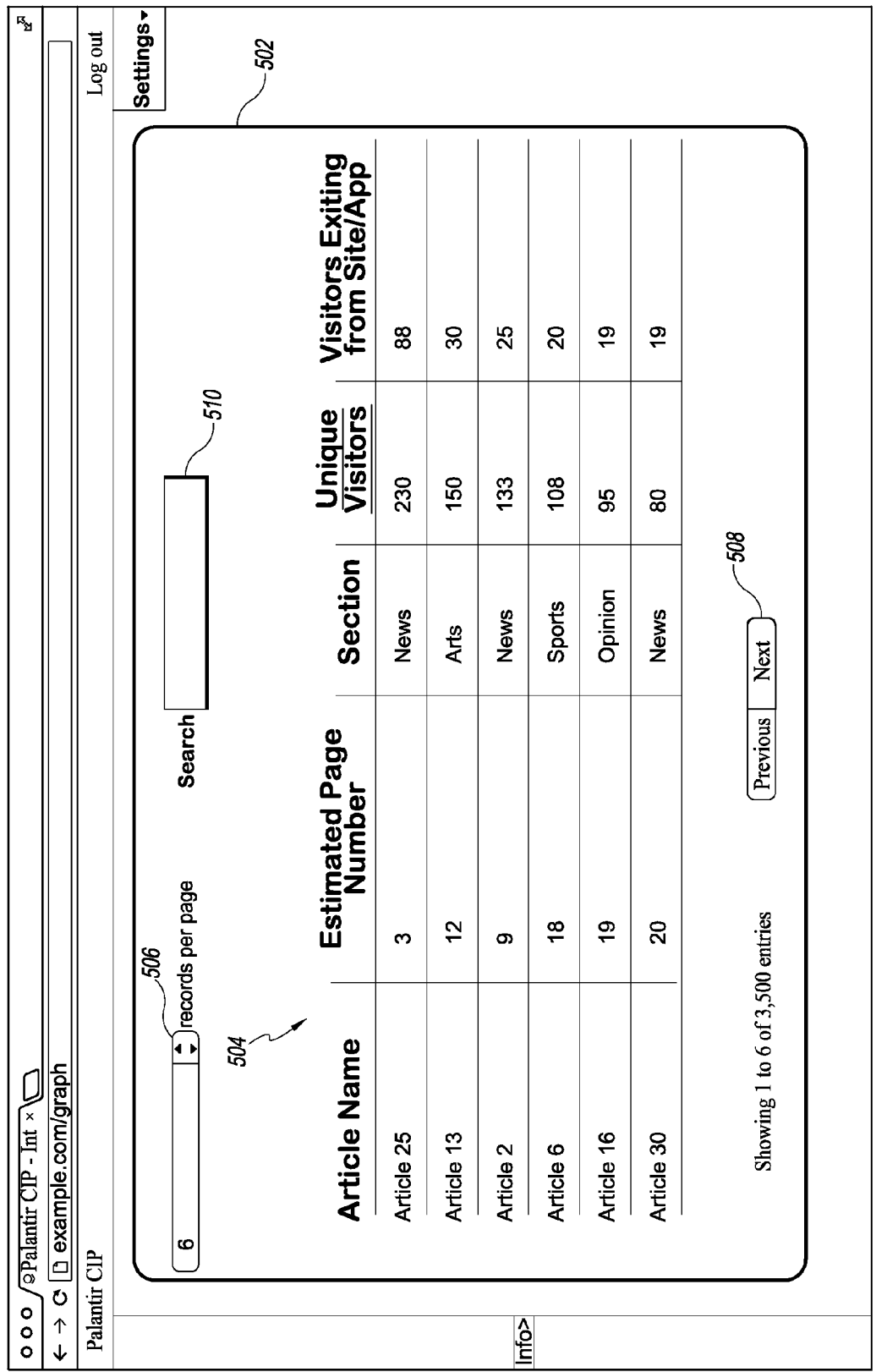
FIG. 5 illustrates a sample user interface of the user interaction data analysis system in which an article table is displayed, according to an embodiment of the present disclosure.

FIG. 5 illustrates a sample user interface of the user interaction data analysis system in which an article table is displayed, according to an embodiment of the present disclosure. The user interface of FIG. 5 may be displayed when, for example, the operator selects "Show Article Table" in the settings panel 150 of FIG. 10. As in the figures above, the user interfaces of FIG. 5 may be displayed in a browser window. As with the embodiments above, the embodiment of FIG. 5 may be implemented in one or more computer modules and/or processors, as is described below with reference to FIGS. 8A-8B.

The user interface of FIG. 5 includes an article table window 502. The article table window 502 includes an article table 504, a "records per page" selector 506, navigation buttons 508, and search box 510. The article table 504 includes columns of article information including article name, an estimated page number, a section, a unique visitor count, and a visitors exiting from site/app. Each row of the article table 504 includes information associated with a particular article. For example, the first row of the article table includes information associated with an article named "Article 25." Article 25 has an estimated page number of 3, is associated with the section News, has had 230 unique visitors, and has had 88 exits. In an embodiment, the rows of the article table 504 may be selectively sorted according to data associated with any particular column. For example, the article table 504 has been sorted according to the number of unique visitors. In an embodiment, the estimated page number of each article is generated by the system based on a particular set of rules. For example, the estimated page number of an article may be based on the articles' position in a generally linear user interaction flow derived from the associated graph. In another example, the articles' estimated page number may be assigned based on a popularity metric, such as a popularity metric based on a combination of the number of views and unique visitors. In another example, the articles' estimated page number may be based on the number of edges between a particular article and a homepage.

In an embodiment, the information displayed in the article table is drawn from the same set of user interaction data as is displayed in the user interface graph when "Show Article Table" is selected in the settings panel. For example, if user interaction data for a particular day is displayed in the graph, viewing the article table will show unique visitor counts based on the same set of data aggregated over the selected particular day. In an embodiment, when the operator has removed and/or added particular nodes to the graph, the article table displays information consistent with the particular articles being removed and/or added.

In an embodiment, the operator may select the number of articles to be viewed in a particular page of the articles table shown in the articles table window 502. In an embodiment, the operator may use the navigation buttons 508 to move from one page of the articles table to another. In an embodiment, the operator may search among all the articles data by typing term and/or other commands into the search box 510. For example, when the operator searches for "News," only articles associated with the section News may be displayed in the articles table. In an embodiment, searches with the search box 510 are implemented as a live search, such that results are immediately updated and displayed in the articles table as the operator types.

In an embodiment, articles table 502 may comprise a listing of other types of content. For example, the table may include a listing of pages, rather than articles. In an embodiment, the system may enable exporting of information displayed in the articles table to another format, for example as a CSV (comma-separated values) file.

Additional Sample Sidebars

FIGS. 6A-6B illustrate additional sample information sidebars of the user interaction data analysis system, according to embodiments of the present disclosure. Sidebar 602 of FIG. 6A illustrates various user metric data that may be displayed for a particular selected article, "Example Article 8." For example, data regarding section, exits, user gender, and user age are displayed. Sidebar 604 of FIG. 6B illustrates various user metric data that may be displayed for a particular selected transition/edge. For example, data regarding the number of users making the selected transition or skipping the transition, time before the transition, user gender, and user age are displayed. As described above, various other user interaction data and/or metrics may be displayed in the sidebar of the user interface of the system.

Sample Operations

Figure 7:
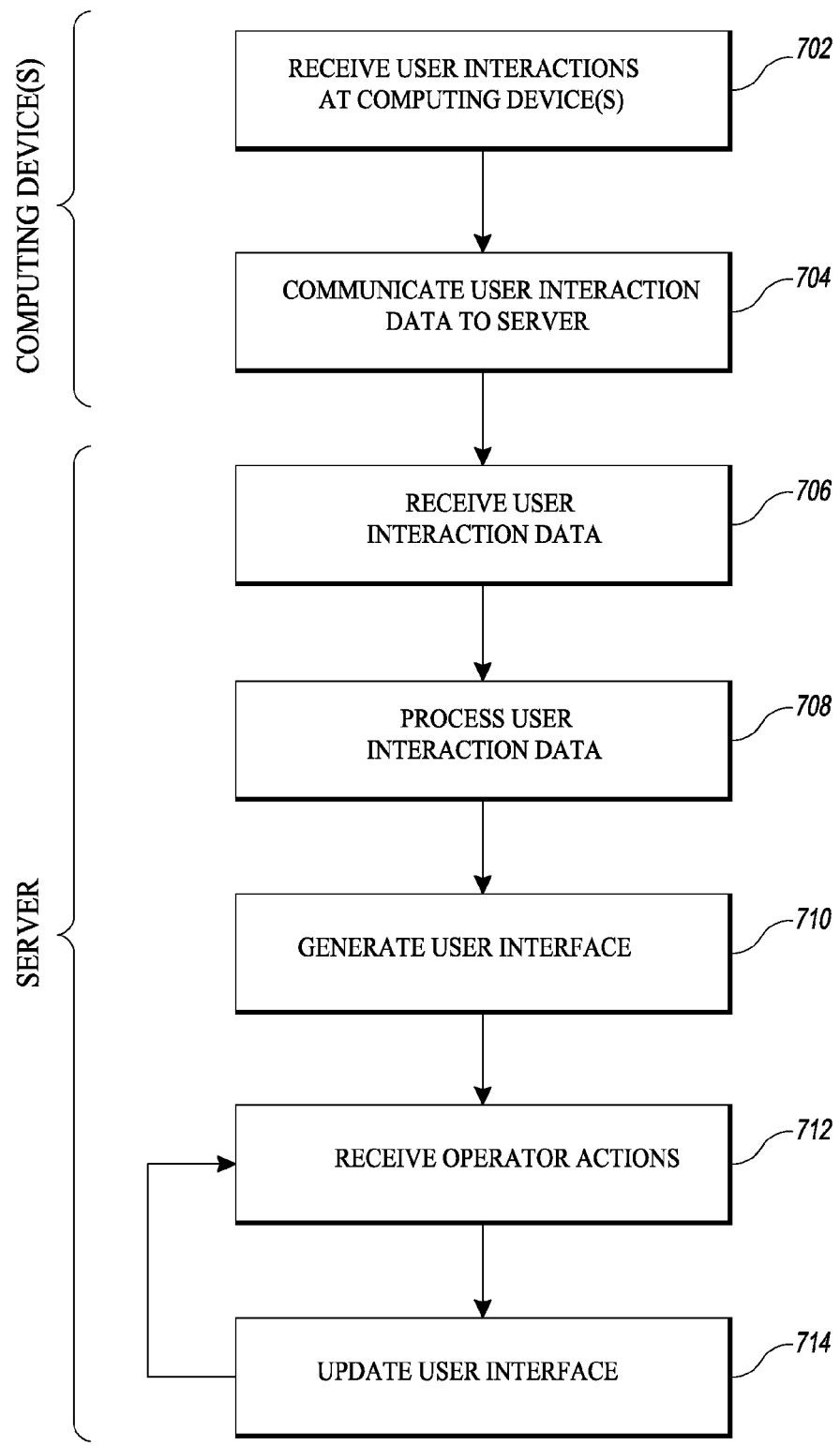
FIG. 7 shows a flowchart depicting illustrative operations of the user interaction data analysis system, according to an embodiment of the present disclosure.

FIG. 7 shows a flowchart depicting illustrative operations and/or processes of the user interaction data analysis system, according to an embodiment of the present disclosure. In various embodiments, fewer blocks or additional blocks may be included in the processes, or various blocks may be performed in an order different from that shown in FIG. 7. In an embodiment, one or more blocks in FIG. 7 may be performed by, or implemented in, one or more computer modules and/or processors, as is described below with reference to FIGS. 8A-8B.

As shown in FIG. 7, in an embodiment blocks 702-704 may be performed by and/or occur at one or more computing devices with which users interact. Blocks 706-714, on the other hand, may be performed by and/or occur at a computer server of the system. These various aspects of the user interaction data analysis system are further described below in reference to FIGS. 8A-8B.

At block 702, user interactions are received at one or more computing devices. For example, user interactions with web apps, tablet apps, and/or smartphone apps (among others) may be tracked and/or stored. At block 704, the user interaction data is communicated to a server of the system.

At block 706, the user interaction data is received at the server. The data is then processed by the server at block 708. For example, the user interaction data may be organized by platform and/or time. Further, user metrics may be processed and/or analyzed. At block 710, a user interface is generated that displays the processed user interaction data, as described with reference to the figures above. For example, a force-directed graph showing user interactions with a particular platform on a particular day may be displayed on the user interface.

At block 712, the operator may interact with the user interface of the system in any of the ways described above. These actions are received by the system, and at block 714, the user interface is updated in response to the operator's actions. For example, the operator may select a node, causing the system to display information associated with that node. In another example, the operator may manipulate one or more nodes of the graph, and/or change various settings, causing the system to update the displayed graph.

In various embodiments, user interaction data may be received and processed by the system at any time and/or continuously. In an embodiment, user interaction data may be updated even as the operator is viewing the data on the user interface. For example, in an embodiment, the operator may use the system to analyze substantially real-time user interaction data.

As mentioned above, the user interaction data analysis system is advantageously configured to provide analysis and visualizations of user interaction data to a system operator (or one or more operators). In various embodiments, interactive visualizations and analyses provided by the system may be based on user interaction data aggregated across particular groups of users, across particular time frames, and/or from particular computer-based platforms and/or applications. According to various embodiments, the system may enable insights into, for example, user interaction patterns and/or ways to optimize for desired user interactions, among others. In an embodiment, the system allows an operator to analyze and investigate user interactions with content provided via one or more computer-based platforms, software applications, and/or software application editions. For example, the system may enable the discovery of where users generally leave a linear (or semi-linear) article flow of an app. The system may enable the discovery of whether a particular app navigation structure or interface is generally meeting users' need. The system may enable an operator to determine which articles/pages are popular or unpopular, or which articles are generally skipped by users. The order in which articles and/or sections are displayed in an app may be optimized based on user interactions. In another example, in-app advertisement placement may be optimized based on insights provided by the system regarding user behaviors. Other advantages not explicitly listed may additionally enabled by the user interaction data analysis system.

Implementation Mechanisms

FIG. 8A illustrates a network environment in which the user interaction data analysis system may operate, according to embodiments of the present disclosure. The network environment 850 may include one or more computing devices 852, one or more mobile computing devices 854, a network 856, an interaction server 858, and a content data store 860. The constituents of the network environment 850 may be in communication with each other either locally or over the network 856.

In an embodiment, the computing device(s) 852 and/or the mobile computing device(s) 854 may be any computing devices capable of displaying content to a user and receiving input from the user. For example, the computing device(s) 852 and/or the mobile computing device(s) 854 may include one or more of the types of computer-enabled devices mentioned above, such as smartphones, tablets, laptops, and/or other types of computing devices. The computing device(s) 852 and/or the mobile computing device(s) 854 may also be capable of communicating over the network 856, for example, to request media, content, and/or application data from, and/or to provide user interaction data to, the interaction server 858.

In some embodiments, the computing device(s) 852 and/ or the mobile computing device(s) 854 may include non-transitory computer-readable medium storage for storing content information, app data, and/or collected user interaction data. For example, either of the computing device(s) 852 and/or the mobile computing device(s) 854 may include one or more software modules that may implement aspects of the functionality of the user interaction data analysis system. These may include, for example, software application 862 and/or user interaction module 864. The software application 862 may be configured to present content to a user and receive interactions from the user. For example, the software application 862 may comprise a web app, smartphone app, and/or tablet app, among others. The user interaction module 864 may be configured to gather user interaction data as the user interacts with the software application, and to communicate the user interaction data to the interaction server 858 for processing and display in the system user interface. Additional aspects, operations, and/or functionality of computing device(s) 852 and/or the mobile computing device(s) 854 are described in further detail in reference to FIG. 8B below.

The network 856 may be any wired network, wireless network, or combination thereof. In addition, the network 856 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The interaction server 858 is a computing device, similar to the computing devices described above, that may perform a variety of tasks to implement the operations of the user interaction data analysis system. The interaction server may include one or more software modules 870 that may be configured to, for example, receive user interaction data, process user interaction data, display the user interface (including the graph including nodes and edges), receive inputs from the operator, and/or update the user interface. The user interaction data may be received from the computing device(s) 852 and/or the mobile computing device(s) 854 over the network 856. Additional aspects, operations, and/or functionality of interaction server 858 are described in further detail in referenced to FIG. 8B below.

The interaction server 858 may be in communication with the content data store 860. The content data store 860 may store, for example, received and/or processed user interaction data, among other data. The content data store 860 may be embodied in hard disk drives, solid state memories, and/or any other type of non-transitory, computer-readable storage medium remotely or locally accessible to the interaction server 858. The content data store 860 may also be distributed or partitioned across multiple storage devices as is known in the art without departing from the spirit and scope of the present disclosure.

In various embodiments, the system may be accessible by the operator through a web-based viewer, such as a web browser. In this embodiment, the user interface may be generated by the interaction server 858 and transmitted to the web browser of the operator. The operator may then interact with the user interface through the web-browser. In an embodiment, the user interface of the user interaction data analysis system may be accessible through a dedicated software application. In an embodiment, the user interface of the user interaction data analysis system may be accessible through a mobile computing device, such as a smartphone and/or tablet. In this embodiment, the interaction server 858 may generate and transmit a user interface to the mobile computing device. Alternatively, the mobile computing device may include modules for generating the user interface, and the interaction server 858 may provide user interaction data to the mobile computing device. In an embodiment, the interaction server 858 comprises a mobile computing device.

According to various embodiments, the user interaction data analysis system and other methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8B:
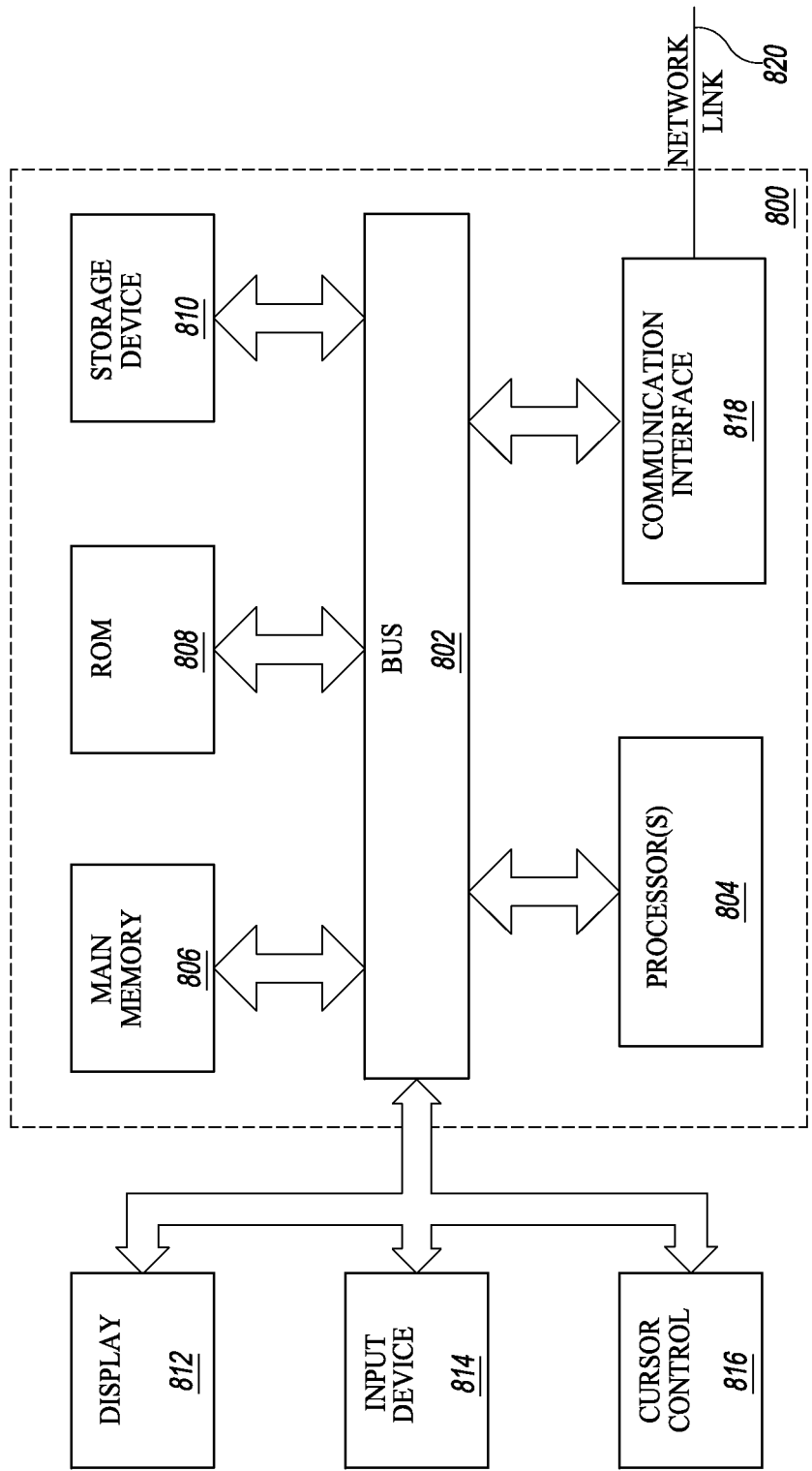

For example, FIG. 8B is a block diagram that illustrates a computer system 800 upon which the various systems, devices, and/or methods discussed herein may be implemented. For example, some or all aspects of computing system 800 may be included in any of computing device(s) 852, mobile computing device(s) 854, and/or interaction server 858. In an embodiment, each of the computing device(s) 852, mobile computing device(s) 854, and interaction server 858 is comprised of a computing system similar to the computer system 800 of FIG. 8B. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT), LCD display, or touch screen display, for displaying information to a computer user and/or receiving input from the user or operator. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include modules to a user interface and the various other aspects of the user interaction data analysis system. These modules may include, for example, the software application 862, the user interaction module 864, and/or the other software module(s) 870 described above, among others. The modules may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more modules and/or instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions and/or modules into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that may be connected to any other interface and/or network, for example network 856 of FIG. 8A. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through one or more local or non-local networks to host computers or other data equipment operated by an Internet Service Provider (ISP).

In an embodiment, the network link 820 may provide data communication services through the world wide packet data communication network now commonly referred to as the "Internet." Communication may be accomplished through the user of, for example, electrical, electromagnetic, and/or optical signals that carry digital data streams. The signals through the various networks and the signals on network link 820 and through communication interface 818, which carry the digital data to and from computer system 800, are example forms of transmission media.

Computer system 800 may send messages and/or receive data, including program code, through the network(s), network link 820 and communication interface 818. In the Internet example, a server or other computer-enabled device or system may transmit a requested code for an application program through one or more networks and/or communication interface 818.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
   one or more computer readable storage devices configured to store computer executable instructions; and
   one or more computing devices configured to execute the computer executable instructions in order to cause the one or more computing devices to:
      generate user interface data useable to render a user interface including at least:
         a plurality of graph nodes each representing respective content items with which one or more users have interacted; and
         a plurality of graph edges each representing user transitions between content items, each of the graph edges connecting respective graph nodes representing respective content items,
         wherein user interaction data indicates user interactions with content items as represented by the graphs nodes and user transitions between content items as represented by the graph edges;
      calculate respective forces associated with one or more graph nodes of the plurality of graph nodes based at least in part on respective numbers of users interacting with content items represented by the respective one or more graph nodes;
      calculate respective forces associated with one or more graph edges of the plurality of graph edges based at least in part on respective numbers of user transitions from one content item to another content item represented by the respective one or more graph edges;
      determine spatial locations of the plurality of graph nodes in the user interface with respect to spatial locations of other of the plurality of graph nodes in the user interface based at least in part on the forces associated with the one or more graph nodes and the forces associated with the one or more graph edges; and
      for each graph edge of the plurality of graph edges:
         determine whether the user interaction data associated with the graph edge indicates more or less than a threshold number of user transitions; and
         in response to determining the user interaction data associated with the graph edge indicates more or less than the threshold number of user transitions, not include, in the user interface, the graph edge.

2. The computer system of claim 1, wherein the forces associated with each of the plurality of graph nodes are repulsive forces.

3. The computer system of claim 2, wherein the forces associated with each of the plurality of graph edges are contractive forces.

4. The computer system of claim 1, wherein at least one of the forces associated with the plurality of graph nodes or the plurality of graph edges is adjustable by an operator.

5. The computer system of claim 1, wherein the spatial locations of the plurality of graph nodes in the user interface are optimized so as to enable an operator of the computer system to determine one or more user interaction patterns.

6. The computer system of claim 1, wherein the plurality of graph nodes and the plurality of graph edges are individually selectable by an operator of the computer system, and wherein, in response to selection of at least one of the plurality of graph nodes or the plurality of graph edges, the one or more computing devices are configured to execute the computer executable instructions in order to further cause the one or more computing devices to generate user interface data useable to render a user interface including at least:
one or more metrics based on interactions of users represented by the selected at least one of the plurality of graph nodes or the plurality of graph edges.

7. The computer system of claim 1, wherein each of the plurality of graph edges is directional and curved.

8. The computer system of claim 1, wherein the content items include at least one of news content, textual content, visual content, audio content, or video content, and wherein user interactions with respective content items are obtained via data collected as multiple users interact with respective content items provided through a software application.

9. A method comprising:
causing display, on an electronic display and by a computing system including one or more computing devices configured to execute specific computer executable instructions, of at least a graph including:
a plurality of nodes each representing respective content items with which one or more users have interacted; and
a plurality of edges each representing user transitions between content items, each of the edges connecting respective nodes representing respective content items;
calculating forces associated with one or more nodes of the plurality of nodes based at least in part on respective numbers of users interacting with content items represented by the respective one or more nodes;
calculating forces associated with one or more edges of the plurality of edges based at least in part on respective numbers of user transitions from one content item to another content item represented by the respective one or more edges; and
optimizing a spatial layout of the displayed graph according to the forces associated with the one or more nodes and the forces associated with the one or more edges.

10. The method of claim 9, wherein the spatial layout of the displayed graph is updated in response to inputs from the operator.

11. The method of claim 10, wherein, in response to the inputs from the operator, the spatial layout of the displayed graph is updated by at least one of: adding nodes and/or edges, removing nodes and/or edges, or adjusting spatial locations of the nodes and/or edges.

12. The method of claim 10 further comprising, by the computing system:
in response to receiving an input from the operator indicating selection of an animation option associated with a particular selected node, successively adding edges and nodes to the graph in an animated fashion, wherein each successively added node represents a most common user destination from a previously added node.

13. The method of claim 9 further comprising, by the computing system:
in response to receiving an input from an operator indicating selection of a transition display threshold, determining, for each edge, a number of user transitions represented by that edge; and
in response to the number of user transitions represented by a particular edge satisfying the selected transition display threshold, not including the particular edge in the graph.

14. A computer readable storage medium storing computer executable instructions configured for execution by one or more hardware processors of a computer system to cause the computer system to:
display a graph including at least:
a plurality of circular graph nodes each representing respective content items with which one or more users have interacted; and
a plurality of graph edges each representing user transitions between content items, each of the graph edges connecting respective circular graph nodes representing respective content items,
wherein each of the plurality of circular graph nodes is sized according to user interaction data associated with the respective circular graph nodes;
calculate forces associated with one or more circular graph nodes of the plurality of circular graph nodes based at least in part on respective numbers of users interacting with content items represented by the respective one or more circular graph nodes;
calculate forces associated with one or more graph edges of the plurality of graph edges based at least in part on respective numbers of user transitions from one content item to another content item represented by the respective one or more graph edges; and
optimize a spatial layout of the displayed graph according to the forces associated with the one or more circular graph nodes and the forces associated with the one or more graph edges.

15. The computer readable storage medium of claim 14, wherein each of the plurality of circular graph nodes is sized based on a number of user interactions associated with respective content items represented by respective circular graph nodes.

16. The computer readable storage medium of claim 14, wherein each of the plurality of circular graph nodes includes a fill color and/or a border color based on one or more user interactions associated with respective content items represented by respective circular graph nodes.

17. The computer readable storage medium of claim 14, wherein locations of each of the plurality of circular graph nodes in the displayed graph are determined based on user interaction data associated with the respective circular graph nodes.

18. The computer readable storage medium of claim 14, wherein the computer executable instructions are further configured for execution by the one or more hardware processors of the computer system to cause the computer system to:
in response to receiving an input from an operator indicating selection of a transition display threshold, determining, for each edge, a number of user transitions represented by that edge; and
in response to the number of user transitions represented by a particular edge satisfying the selected transition display threshold, not including the particular edge in the graph.

* * * * *